United States Patent
Yavari et al.

(10) Patent No.: US 12,409,635 B2
(45) Date of Patent: Sep. 9, 2025

(54) LAMINATED VEHICLE GLAZING, MANUFACTURE THEREOF AND DEVICE WITH ASSOCIATED NEAR-INFRARED VISION SYSTEM

(71) Applicant: SAINT-GOBAIN GLASS FRANCE, Courbevoie (FR)

(72) Inventors: Keihann Yavari, Margny-les-Compiegne (FR); Emmanuel Mimoun, Boulogne-Billancourt (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 204 days.

(21) Appl. No.: 18/546,912

(22) PCT Filed: Feb. 18, 2022

(86) PCT No.: PCT/FR2022/050294
§ 371 (c)(1),
(2) Date: Aug. 17, 2023

(87) PCT Pub. No.: WO2022/175634
PCT Pub. Date: Aug. 25, 2022

(65) Prior Publication Data
US 2024/0123709 A1   Apr. 18, 2024

(30) Foreign Application Priority Data

Feb. 19, 2021  (FR) .................................... 2101634
Mar. 24, 2021  (FR) .................................... 2102963

(Continued)

(51) Int. Cl.
*B32B 17/10*  (2006.01)
*B32B 1/00*  (2024.01)
(Continued)

(52) U.S. Cl.
CPC .......... *B32B 17/10293* (2013.01); *B32B 1/00* (2013.01); *B32B 3/266* (2013.01);
(Continued)

(58) Field of Classification Search
CPC ..... B32B 1/00; B32B 3/266; B32B 17/10036; B32B 17/10119; B32B 17/10201;
(Continued)

(56) References Cited

U.S. PATENT DOCUMENTS 5,162,046 A   11/1992 Mercado
5,620,799 A *  4/1997 Sauer .................. H01Q 1/1271
                                                  52/173.3

(Continued)

FOREIGN PATENT DOCUMENTS

CN   101037099 A   9/2007
CN   201808255 U   4/2011

(Continued)

OTHER PUBLICATIONS

QR International Search Report as issued in International Patent Application No. PCT/FR2022/050294, dated Jun. 9, 2022.

*Primary Examiner* — Mark R Gaworecki
(74) *Attorney, Agent, or Firm* — Pillsbury Winthrop Shaw Pittman LLP

(57) ABSTRACT

A laminated glazing of a vehicle includes a first extra clear glass sheet (exterior glazing), a lamination interlayer and a second glass sheet (interior glazing) with a through-hole in this second sheet including a mineral piece.

23 Claims, 18 Drawing Sheets

(30) Foreign Application Priority Data

| | | |
|---|---|---|
| Mar. 31, 2021 | (FR) | 2103349 |
| Apr. 14, 2021 | (FR) | 2103845 |
| Dec. 22, 2021 | (FR) | 2114260 |

(51) Int. Cl.
  *B32B 3/26* (2006.01)
  *G01S 7/481* (2006.01)
  *G01S 17/931* (2020.01)

(52) U.S. Cl.
  CPC .. *B32B 17/10036* (2013.01); *B32B 17/10119* (2013.01); *B32B 17/10201* (2013.01); *B32B 17/10761* (2013.01); *B32B 17/10935* (2013.01); *G01S 7/4813* (2013.01); *G01S 17/931* (2020.01); *B32B 2307/7376* (2023.05); *B32B 2605/00* (2013.01)

(58) Field of Classification Search
  CPC ........ B32B 17/10293; B32B 17/10761; B32B 17/10935; B32B 2307/7376; B32B 2605/00; G01S 7/4813; G01S 17/931
  See application file for complete search history.

(56) References Cited

U.S. PATENT DOCUMENTS

| | | |
|---|---|---|
| 2004/0080275 A1 | 4/2004 | Schmitt et al. |
| 2004/0258929 A1 | 12/2004 | Glaubitt et al. |

FOREIGN PATENT DOCUMENTS

| | | |
|---|---|---|
| CN | 109641786 A | 4/2019 |
| CN | 110228236 A | 9/2019 |
| CN | 111409314 A | 7/2020 |
| EP | 1 329 433 A1 | 7/2003 |
| EP | 1 985 591 A1 | 10/2008 |
| WO | WO 93/07329 A1 | 4/1993 |
| WO | WO 2004/025334 A1 | 3/2004 |
| WO | WO 2005/049757 A1 | 6/2005 |
| WO | WO 2008/059170 A2 | 5/2008 |
| WO | WO 2014/128016 A1 | 8/2014 |
| WO | WO 2018/015312 A1 | 1/2018 |
| WO | WO 2018/178278 A1 | 10/2018 |
| WO | WO 2018/178286 A1 | 10/2018 |
| WO | WO 2018/178883 A1 | 10/2018 |
| WO | WO 2020/057926 A1 | 3/2020 |
| WO | WO 2020/101874 A2 | 5/2020 |
| WO | WO 2020/200920 A1 | 10/2020 |

* cited by examiner

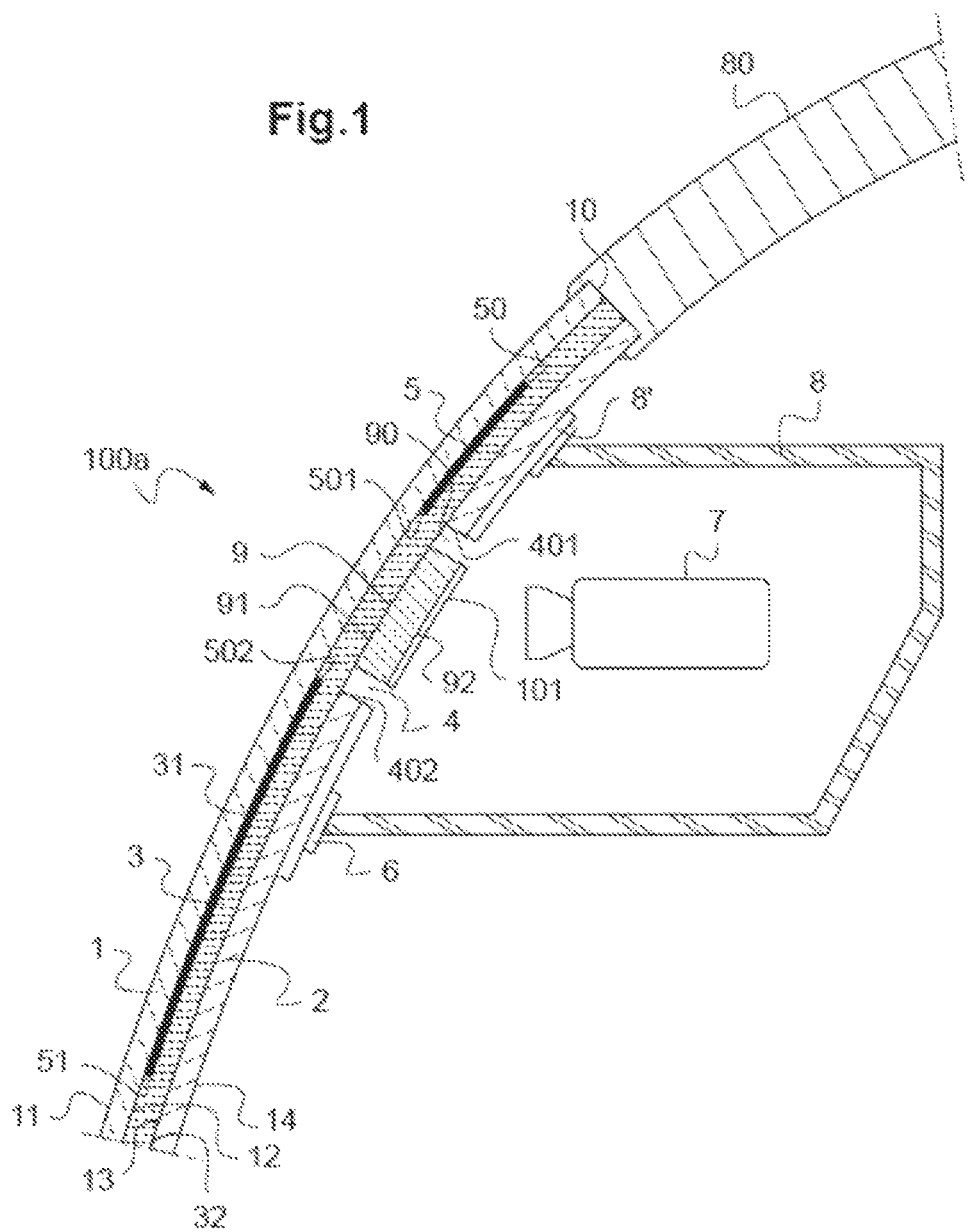

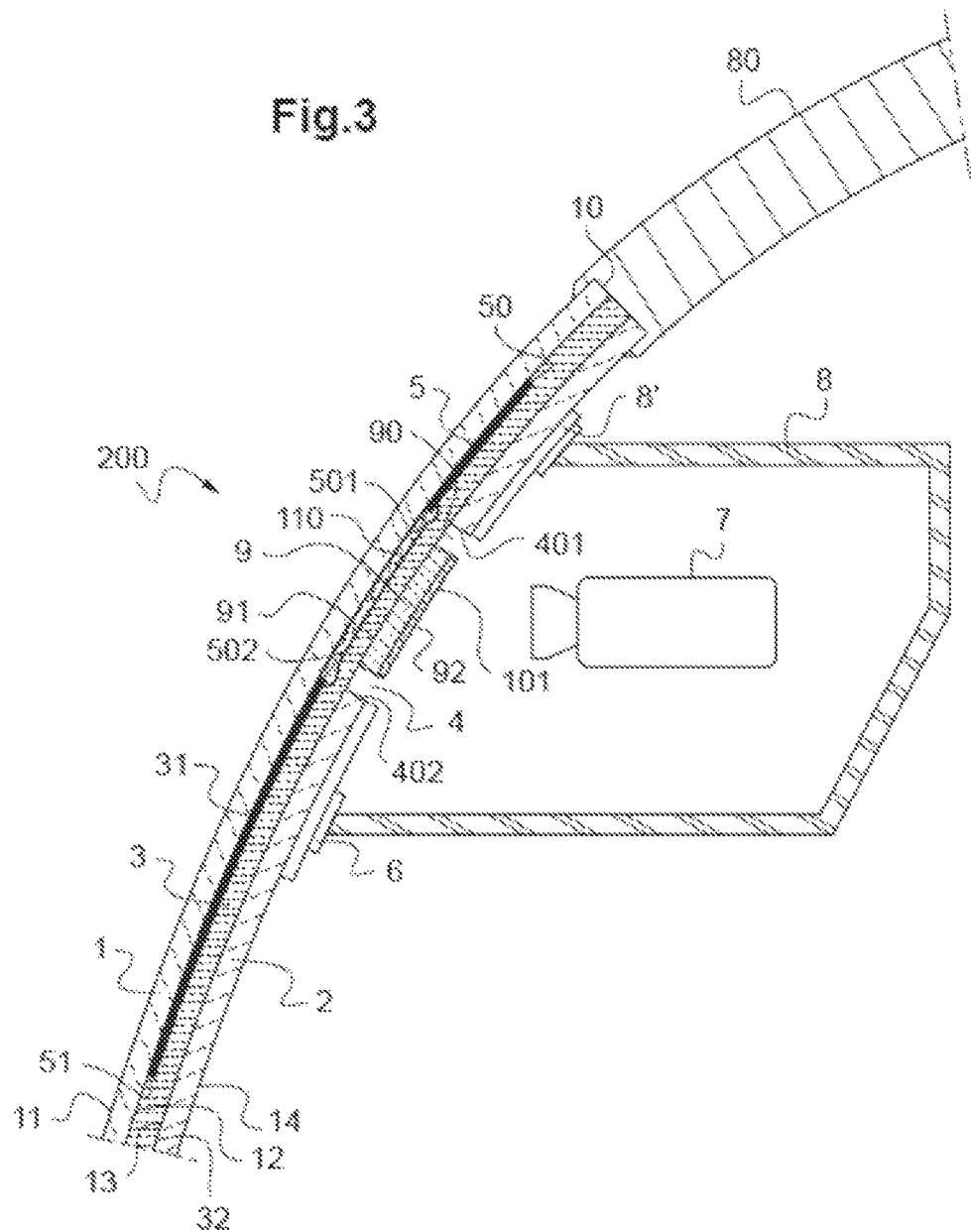

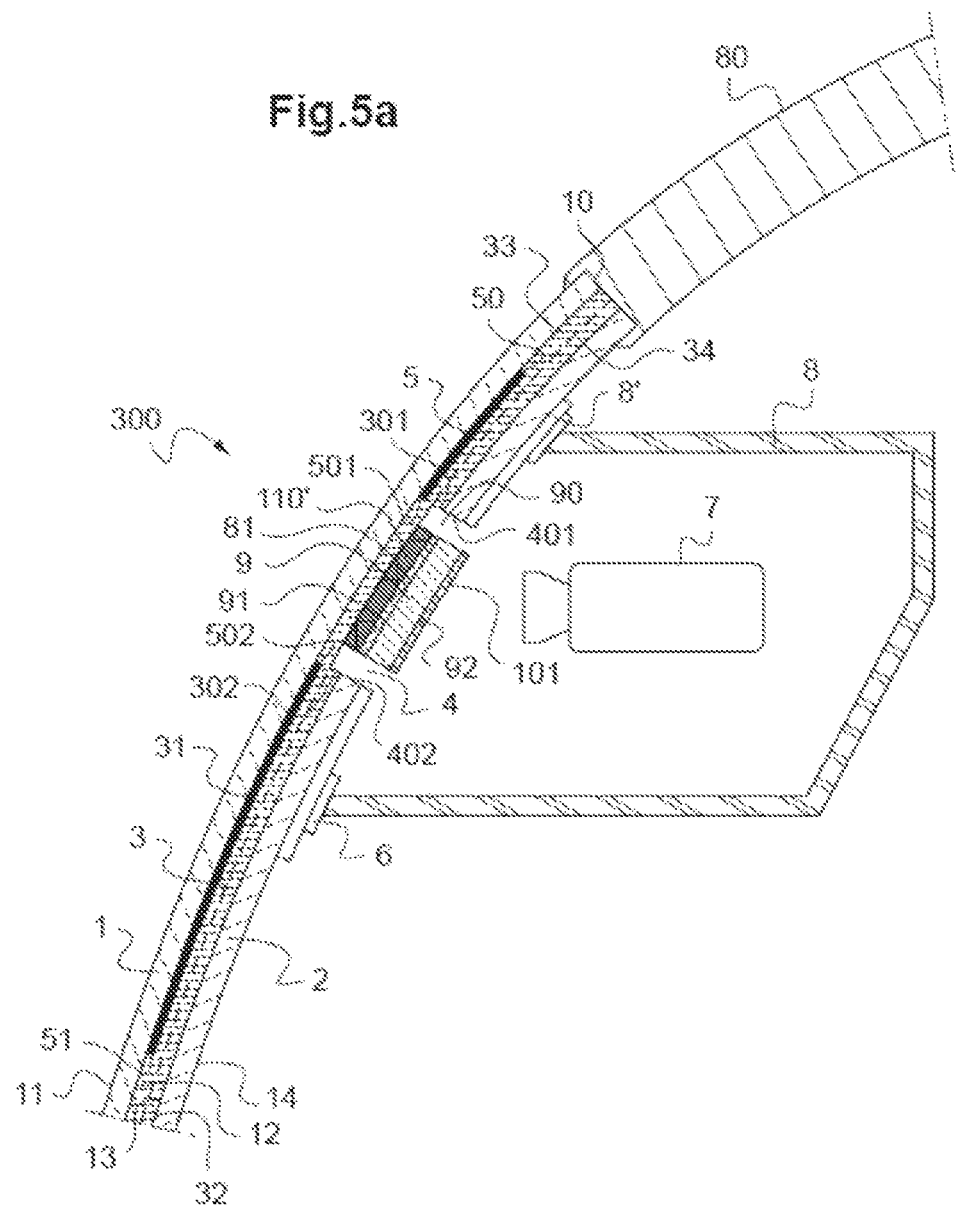

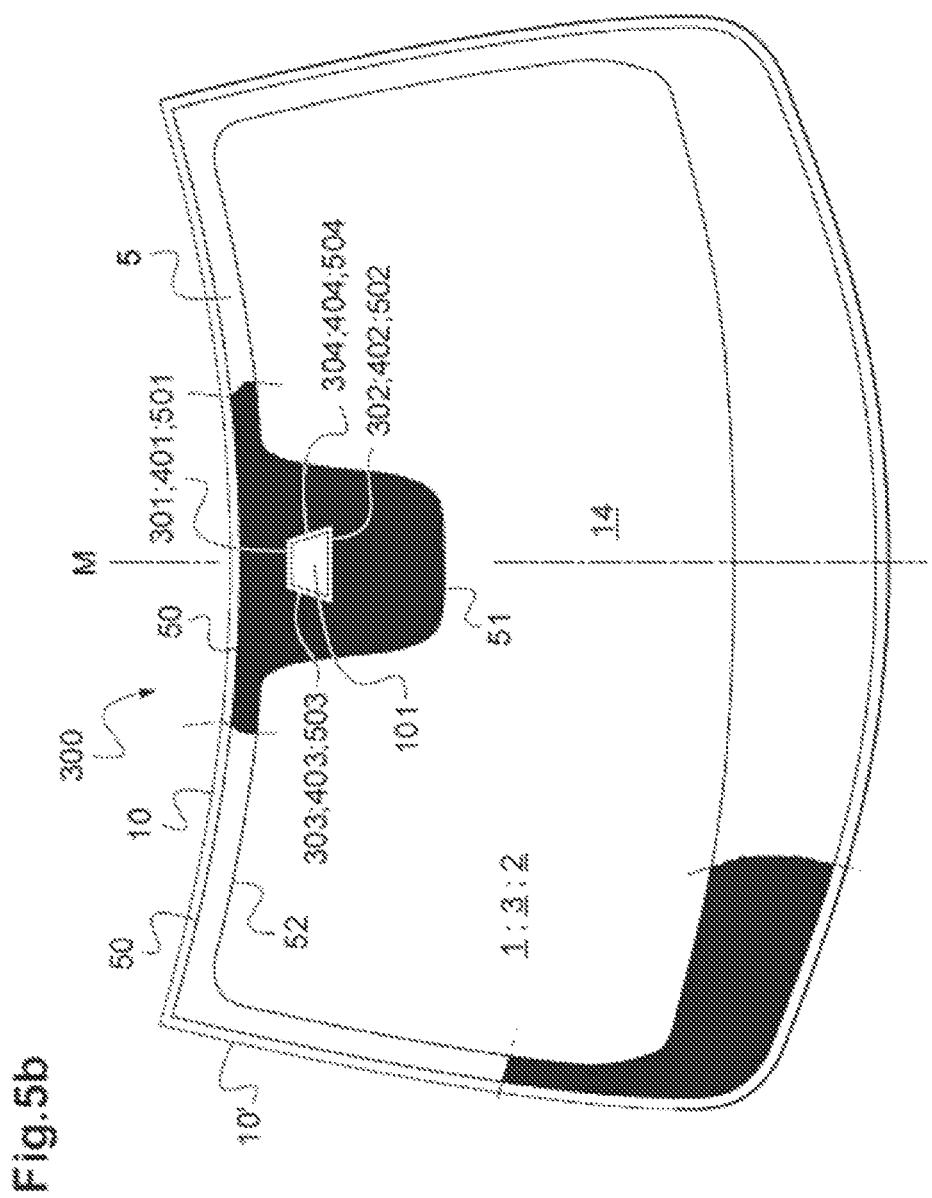

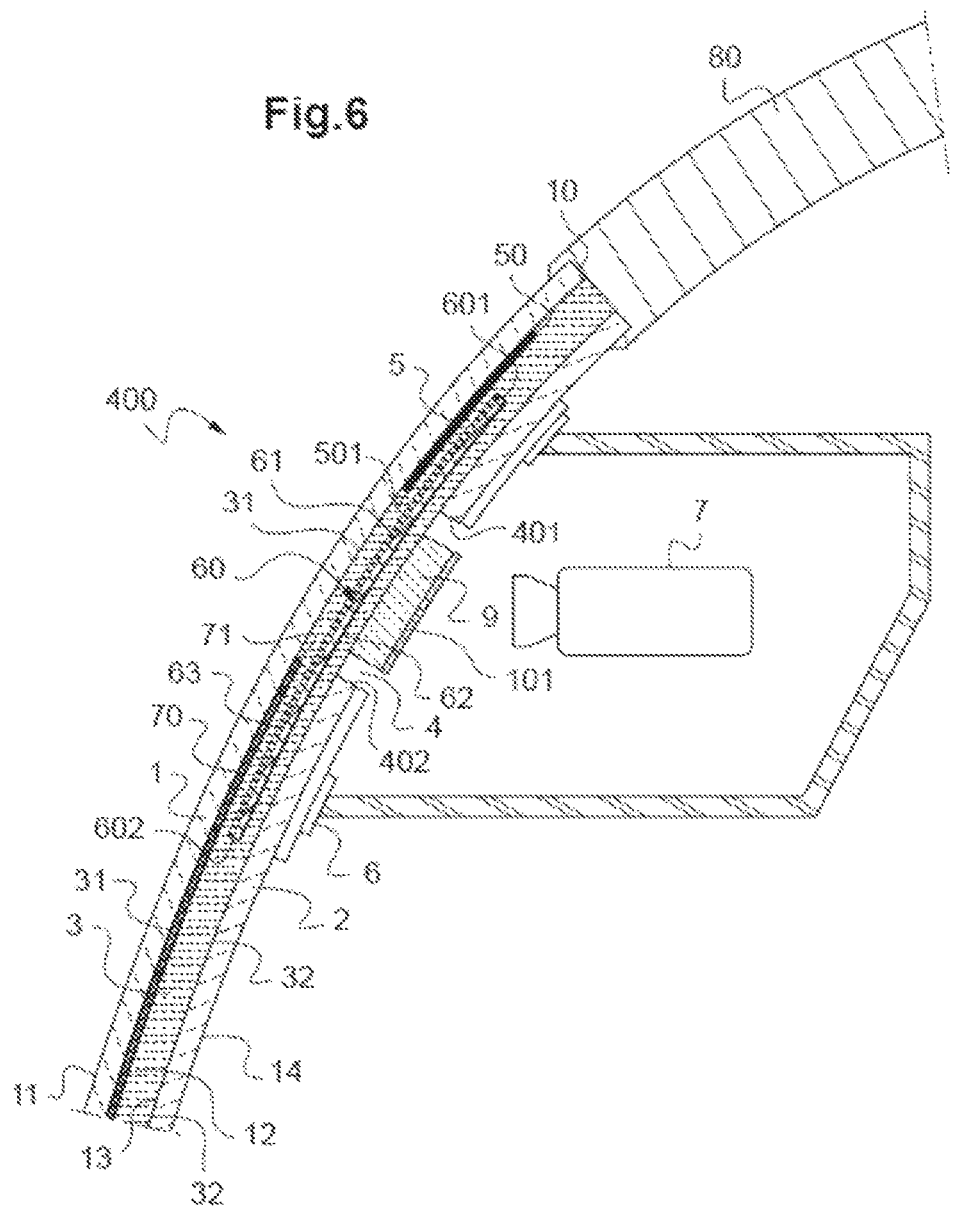

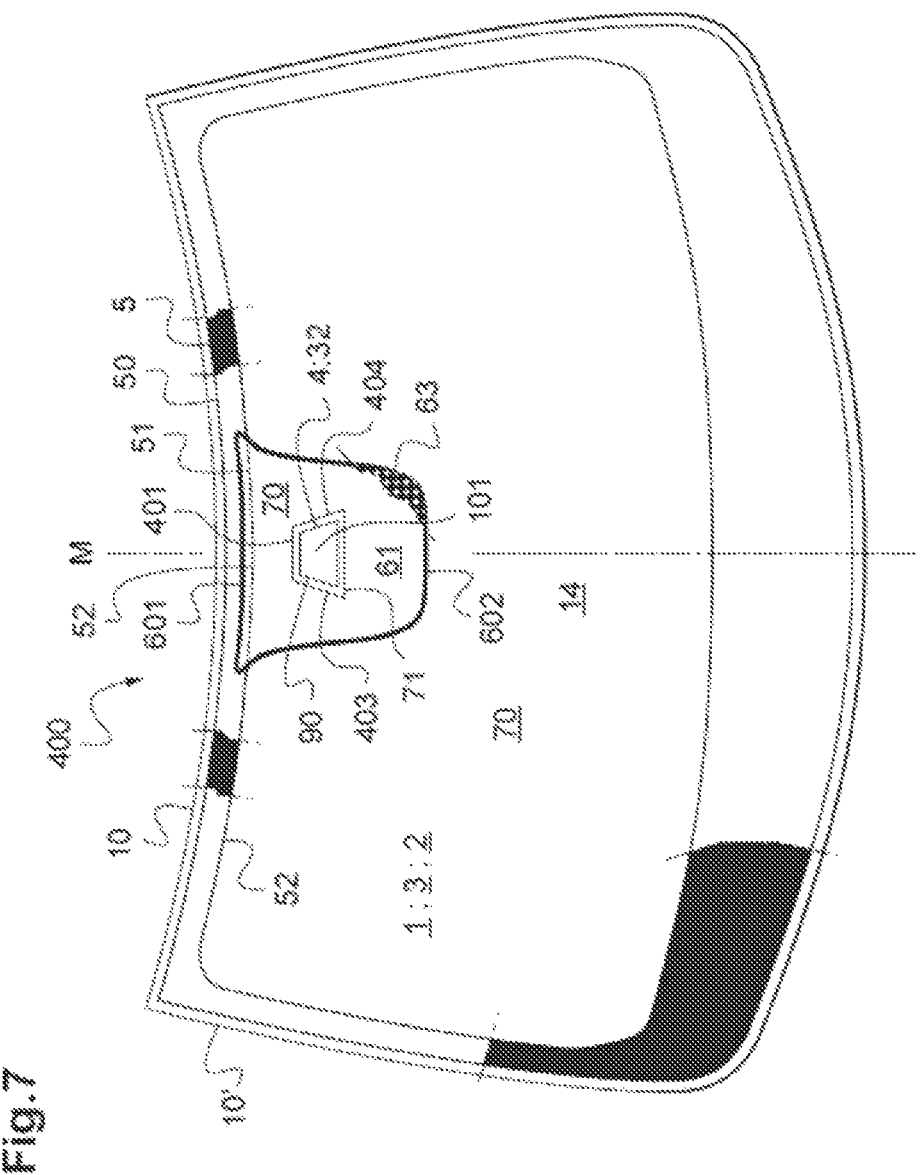

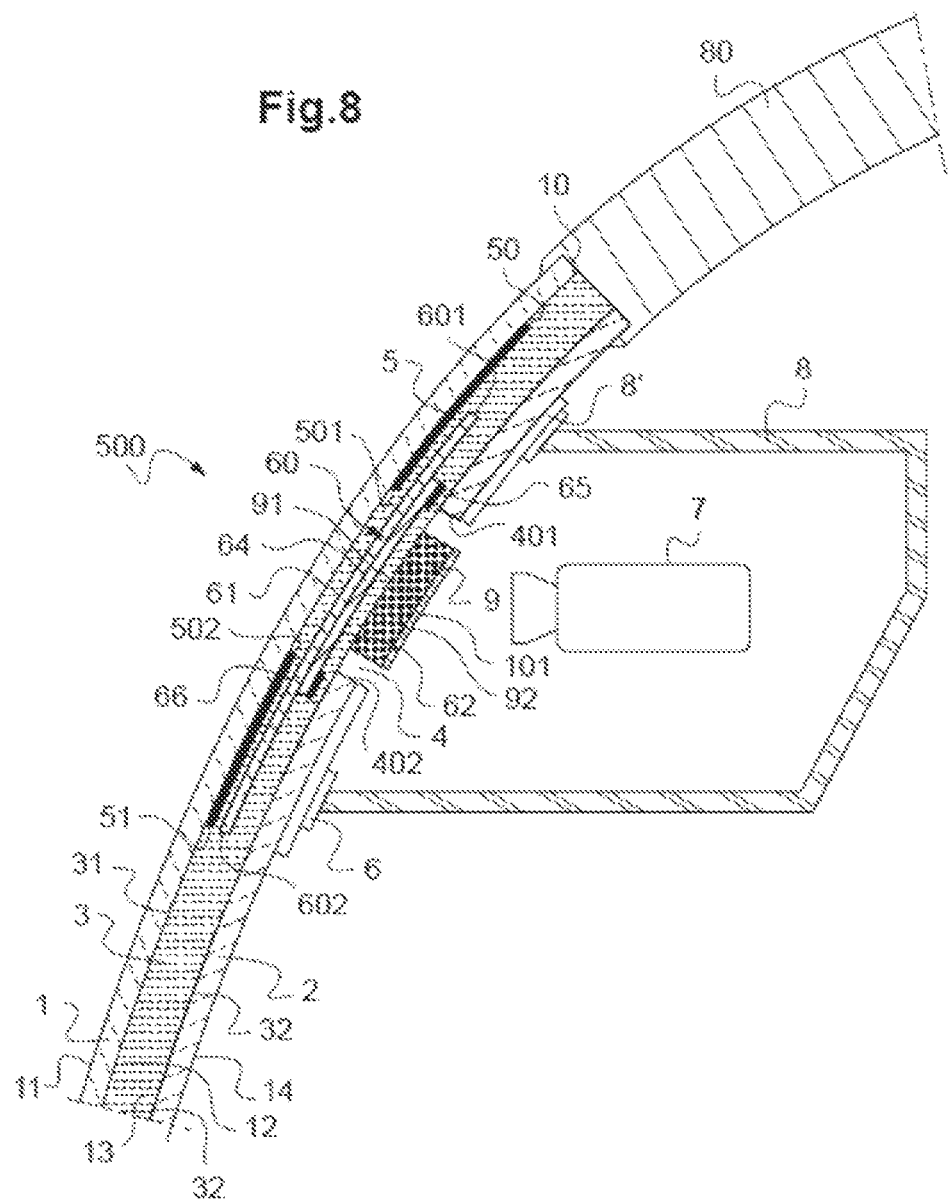

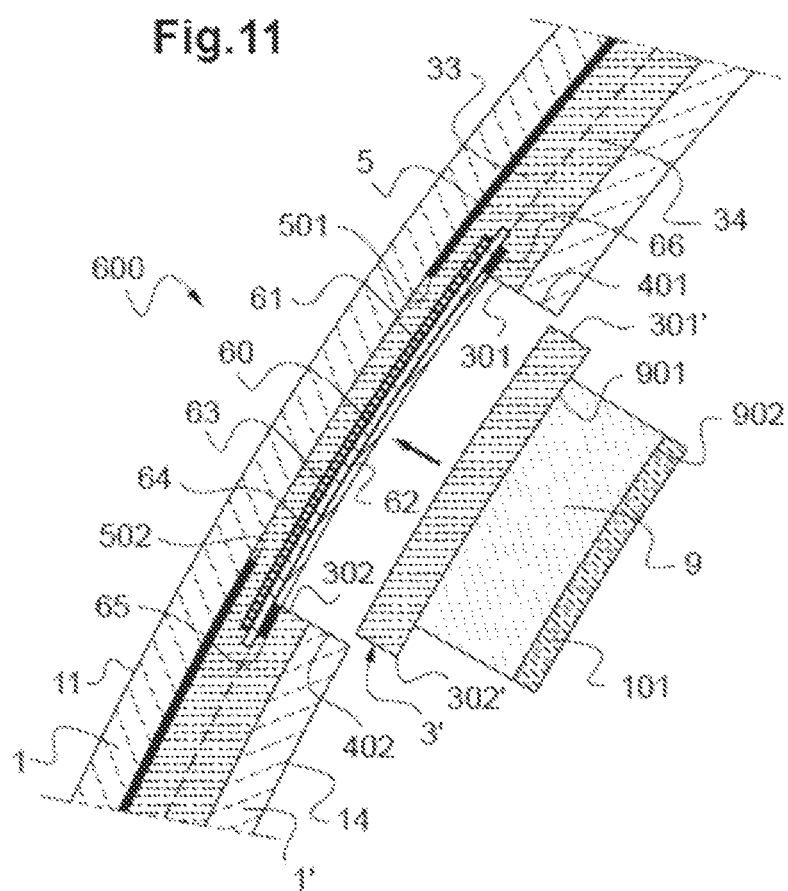

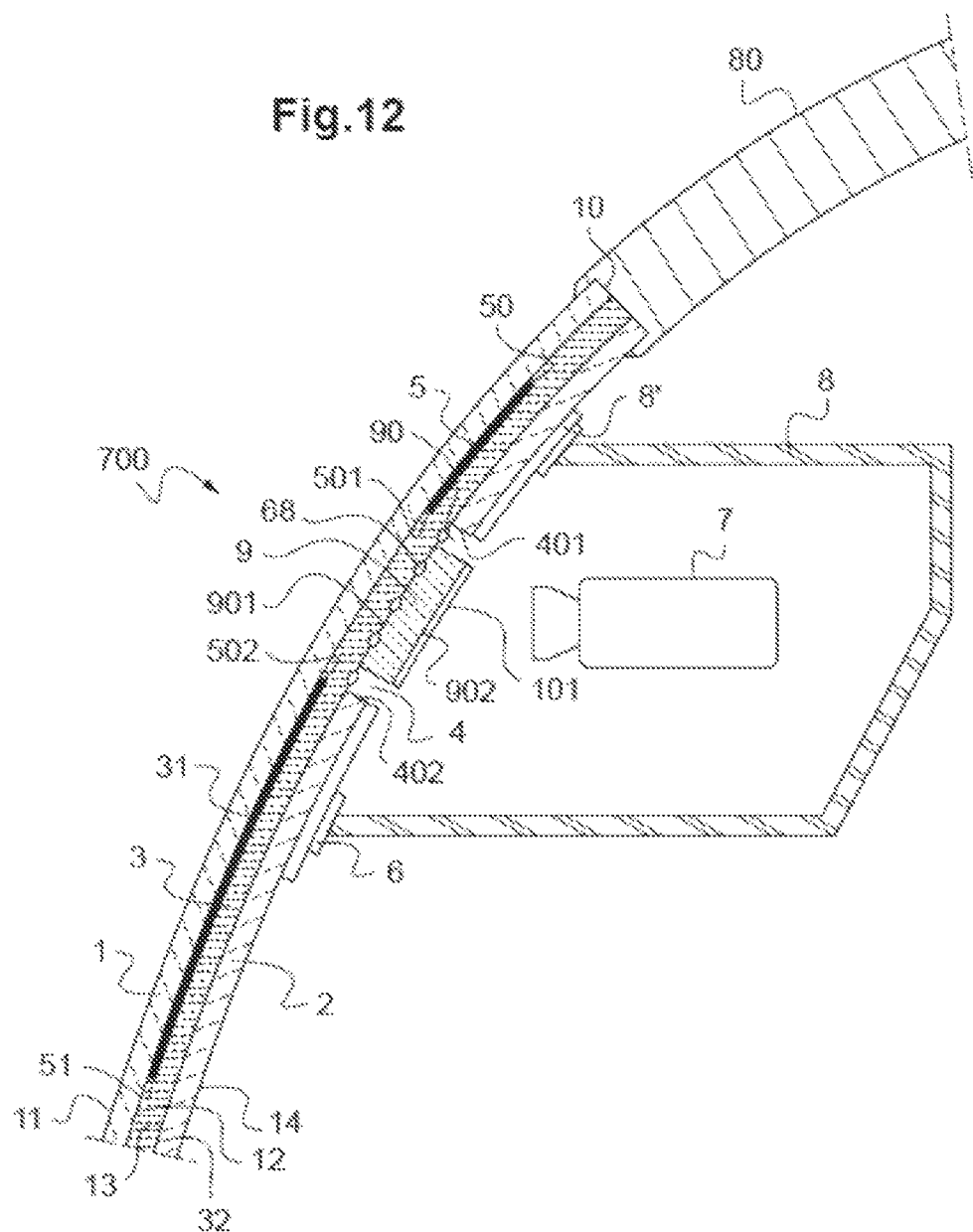

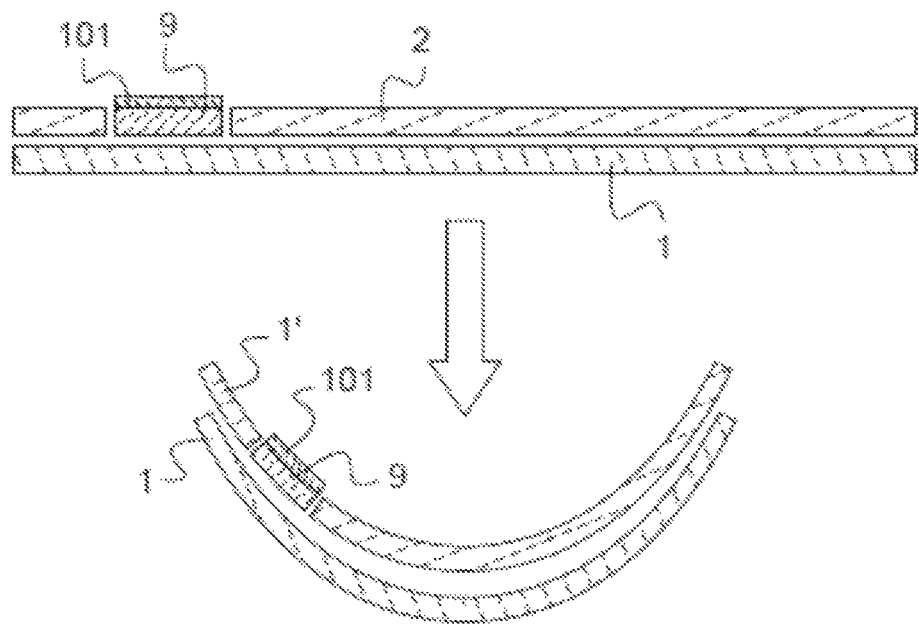

LAMINATED VEHICLE GLAZING, MANUFACTURE THEREOF AND DEVICE WITH ASSOCIATED NEAR-INFRARED VISION SYSTEM

CROSS-REFERENCE TO RELATED APPLICATIONS

This application is the U.S. National Stage of PCT/FR2022/050294, filed Feb. 18, 2022, which in turn claims priority to French patent application number 2101634 filed Feb. 19, 2021, French patent application number 2102963 filed Mar. 24, 2021, French patent application number 2103349 filed Mar. 31, 2021, French patent application number 2103845 filed Apr. 14, 2021 and French patent application number 2114260 filed Dec. 22, 2021. The content of these applications are incorporated herein by reference in their entireties.

The invention relates to a laminated glazing, in particular a windscreen, in a vehicle particularly a road vehicle or train, associated with a near infrared vision system. The invention also describes the manufacture thereof and a device combining said glazing and the infrared vision system.

Autonomous vehicle glazings and the associated technology are constantly evolving, particularly for improving safety.

Laser remote sensing or LIDAR (an acronym for "light detection and ranging" or "laser detection and ranging") can be used in the headlights of autonomous vehicles.

More recently, patent application WO20180153012 suggests placing a LIDAR operating in the near infrared between 750 nm and 1050 nm behind the laminated windscreen comprising two sheets of extra clear glass and an infrared filter.

The performance of this vision device (glazing associated with the LIDAR) can be improved.

To this end, the present invention relates to a laminated (and/or curved) glazing of a vehicle, particularly of a road vehicle (car, truck, public transport: bus, coach, etc.) or railway vehicle (particularly with a maximum speed of at most 90 km/h or at most 70 km/h, in particular subway trains, trams), particularly curved, in particular a windscreen, or a rear window, indeed even a side glazing, of a given thickness E1, for example sub-centimetric, particularly of at most 5 mm for a road vehicle windscreen, the glazing comprising:
- a first glass sheet, particularly curved, intended to be the exterior glazing, with a first main external face F1 and a second main internal face F2 oriented toward the passenger compartment, if a motor vehicle with a thickness preferably of at most 4 mm, and even of at most 3 mm or 2.5 mm—particularly 2.1 mm, 1.9 mm, 1.8 mm, 1.6 mm and 1.4 mm—and preferably of at least 0.7 mm or 1 mm
- a lamination interlayer (single or multi-laminations), optionally neutral, clear, extra clear or tinted, particularly gray or green, made of preferably thermoplastic polymer material and better still polyvinyl butyral (PVB), preferably if a road vehicle with a thickness of at most 1.8 mm, better still of at most 1.2 mm and even of at most 0.9 mm (and better still of at least 0.3 mm and even of at least 0.6 mm), the lamination interlayer being optionally acoustic and/or optionally having a cross section decreasing in the shape of a wedge from top to bottom of the laminated glazing (in particular a windscreen) for a head-up display (HUD), the lamination interlayer having a main face Fa oriented toward F2 and a main face Fb opposite to Fa
- a second glass sheet intended to be the interior glazing, preferably curved and in particular tinted, with a third main face F3 on the side of F2 and a fourth main internal face F4 oriented toward the passenger compartment, if a road vehicle with a thickness preferably less than that of the first glazing, even of at most 3 mm or 2 mm—particularly 1.9 mm, 1.8 mm, 1.6 mm and 1.4 mm—or even of at most 1.3 mm, and preferably of at least 0.7 mm, the thickness of the first and second glass sheets being preferably strictly less than 5 or 4 mm, even than 3.7 mm.

The second glass sheet, particularly silica-based, soda lime-based, preferably soda-lime-silica-based, even aluminosilicate-based, or borosilicate-based, has a total iron oxide content by weight (expressed in the form $Fe_2O_3$) of at least 0.4% and preferably of at most 1.5%.

The first glass sheet, particularly silica-based, soda-lime-based, soda-lime-silica-based, or aluminosilicate-based, or borosilicate-based, has a total iron oxide content by weight (expressed in the form $Fe_2O_3$) of at most 0.05% (500 ppm), preferably of at most 0.03% (300 ppm) and of at most 0.015% (150 ppm) and particularly greater than or equal to 0.005%. The redox of the first glass sheet is preferably greater than or equal to 0.15.

The glazing according to the invention further comprises:
- a through-hole in the thickness of the second glass sheet, the through-hole being centimetric (in size) (along the surface of the second glass sheet), hole delimited by a wall, closed-off hole or opening hole (notch) (particularly on a longitudinal edge),
- in the through-hole and optionally under the through-hole (under face F3) and/or flush with face F4, a piece made of mineral material (particularly glass or glass ceramic) which is transparent at least at a "working" wavelength in the infrared in a range extending from 800 nm to 1800 nm, in particular from 850 nm to 1600 nm, particularly 905±30 nm and/or 1550±30 nm.

The piece according to the invention has:
- a main "bonding" surface, in particular naked or coated with a functional layer, bonded to a thermoplastic bonding film (sheet) which is optionally different from the lamination interlayer (interlayer with optional interlayer through-hole)
- particularly a bonding film which is different from the lamination interlayer and/or made of a separate material to the lamination interlayer—or bonding surface bonded to the main face Fb (interlayer with optional partial interlayer hole on the Fb side)
- and a main surface, referred to as interior surface opposite from the bonding surface, the interior surface comprising an anti-reflective element at said working wavelength.

The piece (in particular made of glass or glass ceramic) is preferably of a thickness of at least 0.1 mm or of at least 0.3 mm and even (if necessary) of at least 0.7 mm and preferably of at most 3 mm, particularly the piece has a size (width and/or surface area) which is less than the through-hole, which piece has an edge face in contact with or spaced apart from the wall delimiting the through-hole by at most 5 mm, preferably spaced apart and by a distance of at most 2 mm and even ranging from 0.3 to 2 mm.

In particular, the through-hole opens out onto said upper longitudinal edge or edge face or is closed off (surrounded by the glass wall of the second sheet), particularly in the vicinity of the upper longitudinal edge face.

Thus according to the invention, the following is selected in order to reach a high level of transmission for the laminated glazing:
1) an exterior glass that is extra clear in the targeted near-infrared region,
2) an interior glass that is more absorbent in the targeted near-infrared region than the exterior glass and necessarily hollowed out.

This solution is more efficient than the one that is based on two solid extra clear glass sheets.

Additionally, by avoiding the use of a second extra clear glass sheet, it improves the comfort (heat inside the vehicle), aesthetics and is less expensive.

Iron oxide, present as an impurity in most of the natural raw materials used in glassmaking (sand, feldspar, limestone, dolomite, etc.), absorbs both in the visible and near-ultraviolet region (absorption due to the ferric ion Fe 3+) and especially in the visible and near-infrared region (absorption due to the ferrous ion Fe 2+). This is why the iron oxide is reduced in the first glass sheet.

In the second glass sheet, the choice can be made to have a higher level of iron oxide.

Moreover, in order to improve safety, this piece according to the invention is added in the through-hole which, so as not to adversely affect the efficiency of the LIDAR, is made of mineral material which is transparent at the working wavelength and by virtue of the anti-reflective element with a particularly high transmission. The anti-reflective element may be an anti-reflective coating or the interior surface which is textured (surface treatment etc), particularly nano-textured.

Preferably, facing said through-hole, the glazing comprising the first glass sheet, the lamination interlayer, the piece with said anti-reflective element (anti-reflective coating or textured surface) has a total transmission of at least 90.0%, 91.0%, or even 92% or 93% at the working wavelength, particularly 905±30 nm and/or 1550±30 nm, particularly measured at the normal (90°) or even preferably also at 60° or even up to 60° with respect to the (local) plane of the piece, for example on the anti-reflective element side.

The total infrared transmission is measured for example with a spectrophotometer such as the lambda 900 from Perkin Elmer.

Naturally, in one embodiment, if use is made of a multi-spectral vision system (in the near infrared range and the visible range) it may also be desired that, facing said through-hole, the glazing comprising the first glass sheet, the lamination interlayer, the piece with said anti-reflective element (anti-reflective coating or textured surface) has a total transmission of at least 90%, 91%, or even 92% at another working wavelength in the visible range, particularly between 400 nm and 700 nm, particularly measured at the normal or even preferably from 90° to 60°, with respect to the local plane of the piece, for example on the anti-reflective element side.

Preferably, before assembly, the piece with said anti-reflective element (anti-reflective coating or textured surface) has a total transmission of at least 91.0%, 92.0%, or even 93.0% or 95% at the working wavelength, particularly 905±30 nm and/or 1550±30 nm, particularly measured at the normal (90°) or even preferably also at 60° or even up to 60° with respect to the (local) plane of the piece, for example on the anti-reflective element side, and even if use is made of a multi-spectral vision system, the piece with said anti-reflective element (anti-reflective coating or textured surface) has a total transmission of at least 91%, 92%, or even 93% at another working wavelength in the visible range, particularly between 400 nm and 700 nm, particularly measured at the normal or even preferably from 90° to 60°, with respect to the plane of the piece, for example on the anti-reflective element side.

In order to quantify the transmission of the glass in the visible range, a light transmission factor, referred to as light transmission, is often defined, often abbreviated to "$T_L$", calculated between 380 and 780 nm and applied to a glass thickness of 3.2 mm or 4 mm, according to standard ISO 9050:2003, thus taking into account the illuminant D65 as defined by standard ISO/CIE 10526 and the C.I.E 1931 standard colorimetric observer as defined by standard ISO/CIE 10527.

Naturally, the light transmission $T_L$ of the laminated glazing in a zone without a hole (central zone of the windscreen) is preferably at least 70%, 75%, 80%, 85%, or 88%.

The invention is particularly suitable for glazings (windscreen, window, etc.) for autonomous or semi-autonomous vehicles: levels L2+, L3, L4 and L5 ("fully" autonomous) as well as vehicles such as Robot Taxis and shuttles, etc.

The angle of the glazing, particularly a windscreen of a road vehicle, can typically be between 21° and 36° with respect to the ground and on average 30°.

Preferably, the anti-reflective element comprises, or even consists of, an anti-reflective coating on the interior surface. In particular,
the anti-reflective coating can comprise, or even consists of, a stack of thin dielectric layers (of oxide and/or of metal or silicon nitrides, for example) alternating high and low refractive indices at the working wavelength, particularly a stack obtained by physical vapor deposition, PVD.
or the anti-reflective coating can comprise, or even consists of, a layer of porous silica, particularly a sol-gel layer of nanoporous silica.

The anti-reflective coating can also comprise an overlayer if it does not alter the anti-reflective properties.

The anti-reflective coating particularly of porous silica according to the invention can have a thickness advantageously of between 10 nm and 10 μm (including these limit values), in particular 50 nm and 1 μm and even more preferentially between 70 and 500 nm.

In a first porous silica embodiment, the pores are the gaps of a non-compact stack of nanometric beads, particularly of silica, this layer being described for example in document US20040258929.

In a second porous silica embodiment, the porous layer is obtained by depositing a condensed silica sol (silica oligomers) densified by NH3-type vapors, this layer being described for example in document WO2005049757.

In a third porous silica embodiment, the porous layer can also be of the sol-gel type as described in document EP1329433. The porous layer can also be obtained with other known pore-forming agents: micelles of cationic surfactant molecules in solution and, optionally, in hydrolyzed form, or of anionic, non-ionic surfactants, or amphiphilic molecules, for example block copolymers.

In a fourth porous silica embodiment, the porous layer can also be of the sol-gel type as described in document WO2008/059170. The porous layer can thus be obtained with pore-forming agents which are preferably polymeric beads.

The layer of porous (or nanoporous) silica can have closed pores of at least 20 nm, 50 nm or 80 nm optionally with pores having a concentration increasing in the direction of the free surface.

The pores can have an elongated shape, particularly like a grain of rice. Even more preferentially, the pores can be substantially spherical or oval-shaped. It is preferred for the majority of the closed pores, or at least 80% of them, to have a substantially identical shape, particularly elongated, substantially spherical or oval-shaped.

The porous silica can be doped for example to further improve its hydrolytic content in the case of applications which require great strength (façades, exteriors, etc.). The doping elements can preferably be selected from Al, Zr, B, Sn, Zn. The dopant is introduced to replace the Si atoms in a molar percentage that can preferably reach 10%, even more preferentially up to 5%.

The anti-reflective coating, particularly the layer of porous silica (sol-gel) can comprise a chemical protection underlayer particularly with a thickness of at most 200 nm for example, particularly a dense silica layer, by sol-gel with a sol-gel functional layer of porous silica on top.

The underlayer can be based on silica or at least partially oxidized derivatives of silicon selected from silicon dioxide, sub-stoichiometric silicon oxides, oxycarbide, oxynitride or oxycarbonitride of silicon.

The underlayer is useful when the underlying surface is made of soda-lime-silica glass because it acts as a barrier to the alkalis.

This underlayer therefore advantageously comprises Si, 0, optionally carbon and nitrogen. But it can also include minority materials with respect to the silicon, for example metals like Al, Zn or Zr. The underlayer can be deposited by sol-gel or by pyrolysis, particularly by gas-phase pyrolysis (CVD). The latter technique makes it possible to obtain layers of $SiO_xC_y$ or $SiO_2$ quite easily, particularly by deposit directly on the float glass ribbon in the case of glass substrates. But the deposition can also be carried out by a vacuum technique, for example by cathode sputtering from a Si target (optionally doped) or a silicon suboxide target (in a reactive oxidizing and/or nitriding atmosphere for example). This underlayer preferably has a thickness of at least 5 nm, particularly a thickness of between 10 nm and 200 nm, for example between 80 nm and 120 nm.

It is also possible to place an anti-reflective element (anti-reflective coating or textured surface) on face F1.

Face F1 may further comprise a functional layer: hydrophobic, etc.

The piece may be spaced apart from the wall by a distance of at least 0.3 mm and at most 3 mm. It is preferred that the piece is spaced apart (by an empty or filled space), but not too much, in order to retain the safety function thereof.

The piece can be curved (convex), following the curvature of the first glass sheet; particularly, the piece is curved and is a tempered glass which follows the curvature of the first glass sheet.

The curved, particularly convex, piece (particularly made of glass) may have a thickness of at least 0.5 mm or 0.7 mm and follows the curvature of the first glass sheet. In one embodiment, this piece is bent simultaneously to the first and second glass sheets. The anti-reflective element is preferably produced before or during the bending. For example, it is a coating (precursor of sol-gel silica with pore-forming agent) which is heat treated (to eliminate the pore-forming agent) by virtue of the bending to have the anti-reflective function, for example to form nanopores.

Examples of bending (of the glass sheets and/or of the piece) are unpressed or pressed gravity bending or else tempered or semi-tempered bending.

If the glass piece undergoes a tempering bending, the piece is curved and is tempered glass.

The curved piece (particularly made of glass) may have a thickness of less than 0.7 mm and for example of at least 0.1 mm or at least 0.3 mm and follows the curvature of the first glass sheet. In one embodiment, this piece is flexible and is curved following the curvature of the first glass sheet for example during the assembly before lamination (and after the bending of the first and second glass sheets). The piece may also independently undergo a heat treatment (optionally for bending), and a tempering operation. Thus, the piece may be made of (thin) tempered, and even curved, glass. The anti-reflective element is preferably produced during said heat treatment. For example, it is a coating (precursor of sol-gel silica with pore-forming agent) which is heat treated (to eliminate the pore-forming agent) for example during the bending to have the anti-reflective function, for example to form nanopores.

The piece is mineral. It preferably comprises at least 90% or 95 or 99% or 100% by weight of mineral material.

The piece may be made of glass ceramic or of glass, particularly (thermally) tempered or chemically tempered.

This may be a silica-based, soda-lime-based, soda-lime-silica-based, or aluminosilicate-based, or borosilicate-based glass which has a total iron oxide content by weight (expressed in the form $Fe_2O_3$) of at most 0.05% (500 ppm), preferably of at most 0.03% (300 ppm) and of at most 0.015% (150 ppm) and particularly greater than or equal to 0.005%.

The piece may be made of K9 borosilicate or BK7 fused silica glass or else made of glass described in applications WO2014128016 or WO2018015312 or WO2018178278.

The piece, particularly curved following the curvature of the first glass sheet may be made of glass, in particular tempered glass, having a total iron oxide content by weight of at most 0.05%, in particular extra-clear glass, particularly soda-lime-silica glass and particularly of identical (or similar) composition to the composition of the glass of the first glass sheet, particularly soda-lime-silica.

The piece may alternatively be made of BaF2, CaF2,

The bonding surface may be:
  naked and in (direct) adhesive contact with face Fb (solid or partially holed interlayer, single or multi-laminations, preferably PVB),
  or coated with a functional layer (film, for example adhesively bonded to the bonding surface or coating, deposited on top by any means, such as PVD or the liquid route), which is in contact with face Fb.

At least a fraction of the thickness of the piece (for example at least 0.1 mm or at least 0.3 mm) is in the through-hole, and even the thickness of the piece is in the through-hole.

The bonding surface is preferably flush under face F3 (particularly lamination interlayer with partial hole or locally reduced thickness) or flush with face F3 or flush over face F3 (in the through-hole), for example an interlayer overthickness via the bonding film, here integral with the interlayer added before lamination, etc., and/or the interior surface being flush under (in the through-hole), flush with, or flush over face F4.

The glazing according to the invention has, under and/or in the through-hole, preferably on the face F2 side (rather than face F1), a selective filter that absorbs in the visible range and is transparent at said working wavelength, spaced apart from (and on the F2 side) or associated with the bonding surface, or the piece forms said selective filter.

The selective filter (forming the camouflaging element) serves to conceal the infrared vision system at said working wavelength such as a LIDAR from the outside of the vehicle without adversely affecting the excellent transmission at the working wavelength.

Said selective filter is for example local with a given surface area S0 and the orthogonal projection of the surface S0 on the second sheet encompasses at least the section Sc of the through-hole or at least 0.9 Sc. For example, S0 ranges from 0.9 Sc to 1.2 Sc. S0 may be smaller than Sc, particularly if the masking layer overhangs under the through-hole (at the periphery).

The selective filter under the through-hole (camouflaging coating on face F2 or on polymer film, camouflaging polymer film particularly adhesively bonded on face F2, etc.) can extend further than the through-hole, for example to conceal one or other sensors, as detailed below.

Preferably, facing said through-hole, the laminated glazing (at least the assembly comprising the first glass sheet, the lamination interlayer, the piece, the selective filter) has:
- a total transmission of at most 10.0%, 5.0%, or 1.0% or 0.5% in the visible range (particularly at least at a reference value in a range from 400 to 700 nm or in the whole range extending from 500 to 600 nm) measured at 90° or even preferably also at 60° or even to 60° on the face F1 side, better still at least in a range extending from 400 to 700 nm, even in the whole visible range between 390 nm and 750 nm, particularly 0.5% from 390-750 nm, and 0.1% from 390-600 nm; in particular, the selective filter (significantly) masking the through-hole as seen from face F1
- preferably retaining a total transmission of at least 90.0%, 91.0%, or even 92.0% or 93% at the working wavelength, particularly 905±30 nm and/or 1550±nm, particularly measured at the normal (90°) or even preferably also at 60° or even up to 60° with respect to the (local) plane of the piece, for example on the antireflective element side.

The piece may form said selective filter, the piece is a glass, particularly a colloidal glass, or a glass-ceramic, or the piece is transparent in the visible range and comprising said selective filter as a film on the bonding surface such as a colored (bulk opaque) polymer film (PET, etc.) having a thickness of at most 0.2 mm, as detailed below.

A colloidal glass contains nanoparticles (transition metal, for example gold, copper) which block (absorb) light from the visible range. A glass is produced, doped with a species which will precipitate in the form of nanoparticles after a heat treatment. An example of colloidal glass is described in application EP1985591. Mention may also be made of the products RG780®, RG830®, and RG850® from Shott.

Other examples of glasses that absorb in the visible range by virtue of Fe and Co (and/or Mn) and Cr to oxidize the glass are described in WO2020/200920A1 or WO2020/057926.

As an example of glass ceramic, mention may be made of the product Keravision® from Eurokera or else a borosilicate, for example described in application WO2020101874.

In one advantageous embodiment, the selective filter is a camouflaging coating which is on face F2 (particularly naked, without underlying coating), facing the through-hole and even protruding under face F3.

This camouflaging coating is for example local with a given surface area S0 and the orthogonal projection of the surface S0 on the second sheet encompasses at least the section Sc of the through-hole or at least 0.9 Sc.

The camouflaging coating is for example a solid layer, or even a layer with discontinuities, for example forming a (micro or nano) mesh.

This camouflaging coating may be of any nature: organic or mineral, ink, varnish (particularly a coloring layer, detailed below); it may be located at said through-hole or be more extensive, for example to conceal one or other sensors, as detailed below.

This camouflaging coating can protrude beyond the through-hole for example by at most 50 mm or better still by at most 20 mm between face F2 and face F3 in a (glazed) zone, referred to as edge zone, of said hole and have a different shape for the filter and the through-hole, for example.

The selective filter may be a colored (bulk opaque) polymer film or with a camouflaging coating adhesively bonded to, or in adhesive contact with, face F2.

This camouflaging film is for example local with a given surface area S0 and the orthogonal projection of the surface S0 on the second sheet encompasses at least the section Sc of the through-hole or at least 0.9 Sc.

For a selective filter involving a polymer film, it is preferred for it to be in adhesive contact with face F2 or with the lamination interlayer or with the piece.

Preferably, the selective filter (for example the piece or the coating on face F2 or on a polymer film) has substantially the same color (black, etc.) and/or optical density as the opaque peripheral masking layer (black, etc.). For example, the optical density difference between the selective filter and the opaque masking layer is at most 5%, 3%, 2% and they are even the same color.

The selective filter (for example the piece or the coating on face F2 or on a polymer film) can be local, in the region of the through-hole (taking up a surface fraction of the glazing) and take up less than 30, 10%, 5% of the glazing.

The selective filter (for example the piece or the coating on face F2 or on a polymer film) can be of any general rectangular, square shape, identical and even homothetic to the shape of the through-hole.

The distance between the upper longitudinal edge and the selective filter can be at most 30 mm, 20 mm 15 and even 10 mm.

Preferably, the laminated glazing comprises at most one functional polymer film (with or without coating on one or two faces) different from the interlayer under and/or in said through-hole and/or at most two or one functional coating under and/or in said through-hole, particularly camouflaging coating adhesively bonded or on face F2 (especially if the piece is transparent in the visible range).

In one embodiment, the laminated glazing is devoid of functional polymer film (with or without coating on one or two faces) different from the interlayer under and/or in said through-hole and even comprises at most one functional coating under and/or in said through-hole, particularly camouflaging coating on face F2 (especially if the piece is transparent in the visible range).

The through-hole is for example closed (as opposed to opening, such as a cavity made in the edge face of the second sheet), particularly spaced apart from the edge face of the second sheet by at least 2 cm, 5 cm, 10 cm or even more.

The film selective filter under the through-hole can protrude beyond the through-hole for example by at most 50 mm or better still by at most 20 mm between face F2 and face F3 in a (glazed) zone, referred to as edge zone, of said hole and have a different shape for the selective filter and the through-hole, for example.

The selective filter on face F2 and/or comprising a film (under the through-hole) will conceal the hole and the LIDAR. The selective filter may extend beyond the zone of the through-hole under face F3. Indeed, it may also be desired to cover a zone devoid of opaque masking layer (which absorbs at the working wavelength), for example a gap of this opaque masking later or else a contiguous zone or a zone in the vicinity.

The selective filter on face F2 and/or comprising a film can thus mask, in particular, a zone referred to as camera zone, devoid of sensor(s), in particular a camera in the visible range or in the far infrared range (thermal camera). Nevertheless, to this end, the selective filter has a (closed or opening) gap in the zone provided for allowing the passage of light rays originating from the scene to be captured by the visible camera and/or a (closed or opening) gap in the zone provided for allowing the passage of rays originating from the scene to be captured by the thermal camera.

The selective filter on face F2 and/or comprising a film can surround the chosen closed hole (present over the whole periphery of the closed hole), for example of a similar or homothetic shape to the hole. The selective filter can also be a simple geometric shape (rectangle, etc.) in which the closed hole is inscribed.

So as not to identify the LIDAR zone, the selective filter preferably does not form an isolated (substantially) opaque zone (which is visible and identifiable from face F1) adjacent to a transparent zone of the laminated glazing over all or part of the periphery thereof. The selective filter can therefore
- be integrated in a masking/decorative zone (such as that which is customary at the periphery of the glazing) provided with an (opening or closed) gap
- be adjacent to this masking zone
- and/or extend under face F3 to form all or part of this decorative zone.

In one embodiment, the selective filter comprises a coloring later comprising a matrix (organic, polymeric, mineral or hybrid) and a coloring agent dispersed in said matrix, said coloring agent absorbing (substantially all) the light located in said visible range and being (substantially) transparent at said working wavelength, which coloring layer forms, in the zone of said hole, the camouflaging coating already described:
- on face F2
- or on the lamination interlayer, on face FA or FB side, preferably made of PVB, in particular ink further comprising PVB particles
- or on a polymer film (which is transparent in the visible range and at the working wavelength), particularly PET in adhesive contact with or adhesively bonded to the piece, of a thickness of at most 0.3 mm or 0.15 mm, preferably bonded to face F2.

The coloring later may be of submillimetric thickness and even of at most 20 µm.

The compound of the coloring layer may be polymeric or an organic-mineral hybrid. The compound/polymer matrix of the coloring later is selected from monomers, oligomers, or polymers comprising at least one methacrylate function, epoxides, varnishes consisting of dispersed particles of PVB, latex, polyurethane or acrylate.

The coloring layer can contain any pigment or dye having a higher transmittance in the infrared than its transmittance in the visible range, such as a near-infrared black ink which substantially absorbs visible wavelengths and transmits those in the near infrared. For example, the coloring layer may contain dyes or inks such as Spectre™ inks, for example Spectre™ 100, 110, 120, 130, 140, 150, or 160 (Epolin, Newark, NJ); Mimaki inks, for example Mimaki ES3, SS21, BS3, SS2, or HS (Mimaki Global, Tomi-city, Nagano, Japan); or Seiko inks, for example Seiko 1000, 1300, SG700, SG740, or VIC (Seiko Advance Ltd., Japan) or else IR9508 black ink from MingBo anti Forgery Technology Co ltd The coloring layer may contain one or more components of black, cyan, magenta or yellow dye.

The coloring layer can include dyes or pigments or both. The coloring layer can include Lumogen® Black FK 4280 or Lumogen® Black FK 4281 (BASF, Southfield, MI).

Preferably, in the coloring layer:
- the dye is selected from Sudan Black Be or Nigrosine Solvent black 5, and is preferably Sudan Black Be
- the dye represents between 0.1 and 10% by weight of the layer, preferably between 0.2 and 3% by weight of the layer.

The coloring layer can be a varnish of less than 30 µm.

For the coloring layer, it is possible to adjust the layer thickness or the percentage by weight of dye, in particular to less than 1%, 5% to 20%, 30%. The selective filter can comprise a colored (bulk opaque) polymer film such as PET, loaded in the bulk thereof with dyes by a "deep dyeing" process by "roll to roll", particularly by submerging in a hot bath with the dyes. The final concentration of dye must be sufficient to provide opaqueness in the visible range. Reference may be made to patent WO9307329 or U.S. Pat. No. 5,162,046.

It is possible, on a (transparent or colored) polymer film such as PET, to place a coloring layer as main face.

It is possible to combine a polymer film such as PET, bulk dyed, and a coloring layer on this film, another polymer film such as PET, on the remaining PET facing said hole or on face F2.

It is possible to provide different extents for the selective filter under face F3 and particularly spaced apart from the piece:
- the selective filter extends under face F3 beyond said through-hole, from the outside extends a masking layer or masks a gap of a peripheral masking layer,
- the selective filter extends under face F3 beyond said through hole, particularly from the outside extends a masking layer or masks a gap of a peripheral masking layer, the selective filter has at least one opening or local discontinuity for allowing the passage of light rays, particularly for at least one additional sensor, in particular a sensor of a visible camera or thermal camera, in particular a camera attached to a holed plate in face F4 for allowing said light or electromagnetic rays (thermal camera) to pass.

The selective filter can be defined by a L*1, a*1 b*1, defined in the L*a*b* CIE 1976 color space. The masking layer of color Cl is also defined by a L*2, a*2 b*2 with a color difference ΔE* given by the following formula $$\Delta E^* = \sqrt{(\Delta L^{*2} + \Delta a^{*2} + \Delta b^{*2})}.$$

Preferably, ΔE*<4, better still ΔE*<2 (discerned with difficulty by the human eye), even better still ΔE*<1 (not discerned by the human eye).

In a first configuration, the selective filter under face F3 extends (mainly) beyond into an edge zone of the through-hole (therefore under the second glass sheet) in order to form, alone, a masking element, in particular a peripheral masking strip and preferably along a longitudinal edge of the glazing, particularly the longitudinal edge of a windscreen or even a masking frame.

In this case, the selective filter has dual functionality and can replace all or part of the opaque enamel (at face F2 and/or F3 and/or F4) or the ink printed on the lamination interlayer conventionally used.

In one embodiment, the masking layer and the selective filter are optionally in separate planes and are outside the through-hole they are contiguous in the sense that their edge faces (those in the vicinity of the through-hole) are aligned, or even their main faces may face one another in part (lateral coverage over at most 50 mm)

or are offset (the edge faces are offset, without contiguousness or coverage) by at most 100 µm in order maintain this visual impression of a continuous opaque (black) strip.

In particular, the edge face of the selective filter is spaced apart (laterally) by at most 100 µm from the gap in order not to see the interruption in opaqueness with the naked eye, and the edge face of the masking layer forming the edge of the gap is spaced apart (laterally) by at most 500 µm from the wall of the through-hole, if it is desired to limit the extent of the selective filter.

In the specific case in which the masking layer is an ink deposited (printed) on the lamination interlayer (PVB), it may be preferred for the ink to be spaced apart from the edge of said through-hole by at least 1 cm in order to prevent delamination.

In the specific case in which the masking layer is an ink deposited (printed) on the lamination interlayer (PVB), it may be preferred for the ink to be spaced apart from the edge of said through-hole by at least 1 cm in order to prevent delamination.

In particular, the selective filter is a camouflaging coating on face F2 and is covered by the masking layer, particularly coverage over at most 50 mm.

In particular, the selective filter is a camouflaging coating on face F2 and the masking layer is on one of faces FA or FB, particularly coverage over at most 50 mm.

In particular, the selective filter is a camouflaging coating on face FA or FB and is covered by the masking layer, for example an ink, particularly coverage over at most 50 mm.

In particular, the selective filter is a camouflaging coating on one of faces FA or FB and the masking layer is on the other of faces FA or FB, particularly coverage over at most 50 mm.

In particular, the selective filter is a camouflaging coating on one of faces F2, FA or FB and the masking layer is on face F3 or F4, particularly coverage (or projection) over at most 50 mm.

The opaque masking layer is preferably a continuous layer (flattened with a solid edge or alternatively a gradient edge (set of patterns).

The masking layer can be at 2 mm or 3 mm (less than 5 mm) from the edge face of the glazing.

The masking layer can be a band framing the glazing (windscreen etc.) particularly in black enamel. A gap is thus created in this masking layer.

Another masking layer can be on face F3 or F4.

The lamination interlayer can comprise a PVB, optionally comprising PVB/functional film such as polymer film with athermal coating/PVB, optionally acoustic PVB, PVB optionally having an interlayer through-hole or preferably a partial through-hole in line with the through-hole.

The interlayer through-hole or partial through-hole can be wider than the second through-hole (at least before lamination) in particular by at most 5 mm or 10 mm.

Preferably, the naked or coated bonding surface is in adhesive contact with face Fb (without glue, without adhesively bonded polymer film).

Preferably, the naked bonding surface or a coating (heating for example) on the bonding surface is in adhesive contact with face Fb (without glue, without adhesively bonded polymer film) and face Fa is in adhesive contact with face F2 or a coating (camouflaging coating, for example) on face F2 (without glue, without adhesively bonded film).

If the interlayer hole is a through-hole, the bonding surface is bonded by the thermoplastic bonding film. The thermoplastic bonding film, particularly another PVB, is different from said PVB of the lamination interlayer, which other PVB contains less than 15% by weight of plasticizers, preferably less than 10% by weight and even better still less than 5% by weight, and/or is said PVB of a different thickness of the lamination interlayer.

In particular, as PVB without plasticizer, it is possible to choose the product "MOWITAL LP BF" from KURARAY with the desired thickness.

The bonding film (other PVB or same PVB) can preferably be in adhesive contact with face F2 or a coating (camouflaging coating, etc.) on face F2.

The lamination interlayer can comprise another functional plastic film (transparent, clear or tinted), for example preferably a polyethylene terephthalate PET film supporting a layer that is athermal, electrically conductive, etc., for example a PVB/functional film/PVB between faces F2 and F3.

The other plastic film can have a thickness of between 10 and 100 µm. The other plastic film can more broadly be made of polyamide, polyester, polyolefin (PE: polyethylene, PP: polypropylene), polystyrene, polyvinyl chloride (PVC), polyethylene terephthalate (PET), polymethyl methacrylate (PMMA) or polycarbonate (PC). A clear film is preferred, in particular PET.

Use may be made, for example, of a coated clear PET film, for example XIR from Eastman, a coextruded film made of PET-PMMA, for example of the SRF 3M® type, but also numerous other films (for example made of PC, PE, PEN, PMMA, PVC).

In the case of a through-hole on the second sheet, the other plastic film may have a free surface before assembly.

The invention relates in particular to a method for manufacturing said laminated glazing as described previously:

a) by lamination, the thermoplastic bonding film, particularly PVB, which is different from or the same as the interlayer material, is in adhesive contact with face F2 or with a functional coating (camouflaging coating, etc.) on face F2, or with face Fb of the lamination interlayer or with a polymer film (said abovementioned other functional film) on the face of the first sheet, the piece particularly being bonded to said thermoplastic bonding film before assembly, b) or by lamination, the piece is in adhesive contact with face Fb of the lamination interlayer, in particular the piece being flexible (cold bending) or bent separately (particularly glass part) or bent simultaneously to the first and second glass sheets (particularly glass part).

Without departing from the scope of the invention, the lamination interlayer clearly can comprise several different types of laminations made of thermoplastic material, for example, with different hardnesses in order to provide an acoustic function, as disclosed, for example, in publication U.S. Pat. No. 6,132,882, particularly a set of PVB laminations with different hardnesses. Similarly, one of the glass sheets can be thin compared to the thicknesses conventionally used.

According to the invention, the interlayer can have a wedge-shape, particularly in view of an HUD (Head Up Display) application.

As a common lamination interlayer, other than PVB, a flexible polyurethane PU, a thermoplastic without plasticizer such as ethylene-vinyl acetate copolymer (EVA), an ionomer resin can be cited. These plastics have a thickness, for example, of between 0.2 mm and 1.1 mm, particularly 0.3 and 0.7 mm.

The space between the piece and the wall can be filled fully or in part (or not) with a filling material (organic and/or inorganic), optionally adhesive (particularly resin, particularly thermosetting, hot melt, for example two-component polyurethane, epoxy, etc.). The thickness of this material is for example less than the thickness of the second sheet and/or of the piece.

The glazing may comprise an insert between the wall of the through-hole and the piece, particularly a closed insert if the through-hole is closed. An insert (annular, of ring type, etc.), for example made of flexible polymer material (polycarbonate etc.) may be housed in, mounted on (particularly adhesively bonded or force-fitted) to the wall of the second glass sheet:
- to serve as mechanical reinforcer,
- and/or for the attachment of a piece or an optical module between the piece and the infrared vision system (LIDAR),
- this insert being able to extend beyond the through-hole, particularly on face F4.

The insert according to the invention is preferably spaced apart from the infrared vision system (LIDAR) and does not serve for the attachment of same.

The glazing thus comprises a communication window encompassing a (first) zone of the first glass sheet facing said through-hole.

The glazing may of course comprise another communication window. The glazing may comprise another zone of the first glass sheet facing another through-hole (closed or opening) of the second glass sheet delimited by another wall provided with another piece (identical or similar to said piece), made of mineral material, transparent at least at the working wavelength in the infrared, which other piece is particularly of a thickness preferably of at least 0.3 mm or 0.1 mm, which other piece with an edge face in contact with or spaced apart from the wall of the other hole by a distance of at most 5 mm and even of at most 3 mm. For example:
- said through-hole is opening, and the other through-hole is closed.
- both holes are closed.

The holes may be of similar size. The opening or closed through-hole (and even the other hole) may have a constant or variable (cross) section Sc, particularly trapezoidal or rectangular or disk-shaped or oval, is for example smaller (in diameter or vertically) by at least 2 cm, 3 cm, 5 cm and preferably larger (particularly horizontally) by at most 30 cm or 25 cm or 20 cm.

For example, the through-hole faces the receiver of the LIDAR, and the other through-hole faces the transmitter of the LIDAR.

The through-hole (and even the other hole) is preferably in a peripheral region, preferably the upper part of the glazing (in installed position), and even in a peripheral central region. The through-hole (and even the other hole) is in particular located in one region and take up less than 10% or even less than 1% of the glazing. For example the lower edge of the through-hole is at most separated by 50 cm from the upper longitudinal edge face of the glazing.

The through-hole can be:
- closed hole (surrounded by the wall of the second glass sheet), therefore within the glazing particularly spaced apart from the closest edge face of the glazing by at least 3 cm or 5 cm
- open or opening, forming a notch (peripheral).

The shape and dimensions of the through-hole (and even of the other hole) are configured according to the techniques of the art in order to effectively and selectively collect all the radiation passing through the glazing (windscreen, window, etc.), particularly in the case of LIDAR the radiation reflected from a solid angle range outside the vehicle and coming from the area in front of the vehicle that is to be captured via the LIDAR.

The through-hole (and even the other hole) may have rounded corners.

If the through-hole is a notch a part of this notch will be masked by the frame of the glazing and thus non-functional for the infrared vision system. If the hole is closed it is too close to the edge and the same applies.

If the through-hole is closed, the edge of the through-hole closest to the edge face of the glazing (preferably upper longitudinal edge and particularly in a central zone) is spaced apart from this edge face of the glazing (of the second sheet) preferably by at least 2 cm or 3 cm and better still 5 cm.

The through-hole can be in the central zone of the upper longitudinal edge of the windscreen, the usual zone of the interior rearview mirror (rearview mirror adjacent to the through-hole or rearview mirror eliminated depending on the vehicle), zone where a masking layer on face F2 and/or bonded to the interlayer is generally wider than on the adjacent lateral zones along the upper longitudinal edge (passenger, driver, etc.).

The through-hole (and even the other hole) is preferably longer than it is high.

Preferably, the through-hole (and even the other hole) has a horizontal dimension, referred to as length L1 (parallel to the upper longitudinal edge) and a vertical dimension of the hole, referred to as height H1 (perpendicular to the upper longitudinal edge), the length L1 is greater than the height H1.

In particular, the section of the hole (and even of the other hole) is a quadrilateral, particularly a rectangle or trapezoid, with:
- a first (large) "upper" longitudinal side (closest to the edge face of the upper longitudinal edge of the glazing)—of length L1a preferably of at most 30 cm, cm, or 15 cm or 12 cm
- a second (large) "lower" longitudinal side (farthest from the edge face of the upper longitudinal edge of the glazing, closer to the central zone) preferably parallel to the edge face of the upper longitudinal edge of the glazing and of a length L1b preferably of at most 35 cm or 30 cm or 25 cm or 20 cm and preferably larger than that of the first large side
- of a height (between these first and second large sides) preferably of at least 5 cm and even of at most 15 cm.

If the hole is closed, the first (large) "upper" longitudinal side is preferably parallel to the edge face of the upper longitudinal edge of the glazing and particularly spaced apart by at least 5 cm or 6 cm from the edge face (of the upper longitudinal edge of the glazing).

If the hole is open (notch), the first (large) "upper" longitudinal side is preferably defined as the upper edge of the emptied zone.

A central line M is defined passing through the middle of the upper edge which can be an axis of symmetry of the glazing. The through-hole can be central, then the line M passes through the through-hole and divides it into two, particularly identical, parts.

In one embodiment, the glazing comprises a heating zone (by wire(s), by layer) which takes up all or part of the surface of the glazing, conventionally made of a material that is transparent in the visible range but not necessarily transparent enough at the infrared working wavelength of the infrared vision system (LIDAR) in a range extending from 800 nm to 1800 nm, in particular between 850 nm and 1600 nm. In particular there can be a first "main" heating zone, extending over all or part of the glazing optionally outside the zone in front facing the through-hole and facing said optional other through-hole.

It may also be desirable for the communication window (and the other optional communication window) to be protected against frost and mist particularly by heating.

This can be done by one or more heating metal wires located facing the through-hole or even in the vicinity thereof or even by one or more heating wires extending over all or part of the glazing. The arrangement of the one or more wires can make it possible to maintain overall transparency at the infrared working wavelength.

This can also be done by a local heating layer facing the through-hole made of a material that is transparent at the infrared working wavelength.

In one embodiment, the glazing according to the invention can comprise at least one metal wire (a coiled wire, for example) particularly heating, bonded to the lamination interlayer, within the lamination or particularly on the side of face Fb particularly anchored on face Fb (or even on the side of Fa, anchored on Fa) and optionally absent facing said through-hole and said optional other through-hole.

It may be sought to avoid the heating wire or wires facing the through-hole and/or said optional other through-hole for reasons of optical distortions.

More specifically, it is possible to have a local heating zone under and/or in said through-hole, in particular spaced apart or on the bonding surface, particularly by an arrangement of tracks or wire(s) (wire(s), etc.) of a material, particularly absorbent, which arrangement is for keeping the overall transparency at the working wavelength in the infrared or by a heating layer made of material which is transparent at the working wavelength in the infrared, particularly organic (ink, conductive polymer) or inorganic.

The local heating zone can be connected to at least two electrical leads which are in particular one or more flat connectors or (in the case of a heating layer) electrically conductive busbars intended for connecting to a voltage source so that a current path for a heating current is formed therebetween. It is not always necessary to have busbars in the case of heating wire(s) for which a flat connector (useful for point contacts such as wires) can be used.

The two electrical leads are preferably masked off from the outside by a masking layer which is opaque (in the visible range and in the infrared at the working wavelength) and/or by a selective filter (opaque in the visible range and transparent in the near infrared) further toward the outside than the busbars, particularly a camouflaging coating on face F2.

The heating layer can have a sheet resistance of at most 100 or 50 or even 30 ohms per square. The heating layer is for example mineral.

The supply may be 12 V, 24 V, 15 V, 48 V.

More generally, the local busbars are preferably masked from the outside by a masking element:
coating and/or film which is opaque (in the visible range and the near infrared at the working wavelength) on face F2, such as an enamel (screenprinting, etc.) or on or in the lamination interlayer, such as an ink (printed)
selective filter (opaque in the visible range and transparent in the near infrared at the working wavelength), preferably a camouflaging coating on face F2.

The local heating zone, in particular the local heating layer, can extend beyond the through-hole for example over at most 30 mm. It can have the same shape as the through-hole, particularly homothetic (trapezoidal etc.) or even any other shape, for example rectangular (and trapezoidal hole). The two local busbars or flat connector(s) are thus preferably all or in part offset from the through-hole under face F3 and even masked from the outside, as already described.

The local heating layer can be spaced apart from the bonding surface, particularly under the through-hole and extending under face F3, with the two local busbars all or in part offset from the through-hole, under face F3 and even masked from the outside, as already described. The first and second busbars are preferably at a distance of at most 1 cm from the through-hole.

The local heating layer can be spaced apart or on the bonding surface and the two local busbars are at a distance of at most 30 cm or even 20 cm, or even are lateral, particularly vertical or oblique, along the short sides of the trapezoidal through-hole.

The local heating layer can be on the bonding surface with the two local busbars, preferably at the periphery, masked from the outside as already described by the opaque masking layer and/or by a selective filter, particularly a camouflaging coating on face F2.

To this end, the opaque masking layer can then overhang under, and at the periphery of, the through-hole.

In the case of two through-holes, it is possible to have another separate local heating zone or a common local heating zone.

It is possible in particular to have:
an optional main heating zone with at least two electrical leads typically in the peripheral zone of the glazing (on the same edge, on two opposite edges or even two adjacent edges of the glazing), for example by an electrically conductive heating coating (holes in line with the through-hole)
the local heating zone with at least two electrical leads or local busbars, first and second busbars preferably masked from the outside as mentioned above.

Preferably, the busbars are on either side of the through-hole.

In one configuration, the first and second busbars, particularly in the vicinity of the through-hole, are on two opposite sides of the through-hole.

One or the busbars (local) can be continuous or discontinuous by sections.

The busbars (local) are in the form of particularly rectangular strips which are (at least in part) outside the zone of the through-hole.

The width of the busbars (local) is preferably from 2 mm to 30 mm, in a particularly preferred way from 4 mm to 20 mm and in particular from 10 mm to 20 mm.

A busbar (local) particularly in a layer (printed) preferably contains at least one metal, a metal alloy, a metal and/or carbon compound, in particular preferably a noble metal and, in particular, silver. For example, the printing paste preferably contains metal particles, metal and/or carbon particles and, in particular, noble metal particles such as silver particles. The thickness of a layer busbar (printed) can preferably be from 5 µm to 40 µm, in a particularly preferred way from 8 µm to 20 µm and more particularly preferably from 8 µm to 12 µm.

Alternatively, however, it is possible to use for one or each busbar (local) an electroconductive sheet, particularly a strip, for example rectangular. The busbar then contains, for example, at least aluminum, copper, tinned copper, gold, silver, zinc, tungsten and/or tin or alloys thereof. This sheet busbar (strip) preferably has a thickness of 10 µm to 500 µm, in a particularly preferred way of 30 µm to 300 µm.

The sheet busbar is in particular used for the heating wires bonded to the lamination interlayer.

The first busbar is preferably (substantially) horizontal and closest to the upper longitudinal edge of the glazing and the second busbar is then preferably (substantially) horizontal, first and second busbar on either side of the through-hole.

The supply of power is for example of 15 V or 48 V.

The length of the busbars are adapted to measure, for example equal to or longer than the sides of the through-hole facing them.

It is sought to bring the busbars as close together as possible to increase the power density in the transparent heating layer. Preferably, the distance between busbars is at most 20 cm or 10 cm or 6 cm.

The supply of power of the (first, second) busbars can be provided wirelessly and/or with a connector (wires, flat connectors, etc.).

The busbars can be lateral, that is to say to the left and right of the through-hole along the lateral edges of the glazing.

The first busbar can be preferably lateral (vertical or oblique) and the second busbar is then preferably (substantially) lateral (vertical or oblique), first and second busbar on either side of the first through-hole.

In a first configuration (with horizontal dedicated busbars):
  the first local busbar (sheet or coating) is adjacent and even parallel to a first large side of the trapezoidal (or rectangular) through-hole, preferably large side closest to the upper longitudinal edge of the glazing,
  the second local busbar (sheet or coating) is adjacent and even parallel to a second large side of the trapezoidal (or rectangular) through-hole, busbars on either side of the through-hole.

In a second configuration (with lateral dedicated busbars (vertical or oblique)):
  the first local busbar (sheet or coating) is adjacent and even parallel to a first small side of the trapezoidal (or rectangular) through-hole
  the second local busbar (sheet or coating) is adjacent and even parallel to a second first small side of the trapezoidal (or rectangular) through-hole, busbars on either side of the first through-hole.

In the case of a round or oval through hole, the busbars (substantially horizontal or lateral, common or dedicated busbars) can be curved to match the shape of the through-hole.

For busbars under and/or offset from the through-hole, vertical or oblique lateral busbars (parallel with respect to the small sides of the through-hole) may be preferred since the horizontal busbars can generate local overthicknesses that promote distortions.

The first local heating zone and/or overall heating zone comprises for example one or a plurality of individual metal wires, referred to as "heating metal wires" which connect the "busbars" to one another. The heating current passes through these individual metal wires.

In particular, the glazing can comprise at least one first metal wire (a coiled wire for example), particularly heating, bonded to the lamination interlayer facing the through-hole particularly:
  on the side of face Fb particularly anchored on face Fb or within the lamination interlayer between a first lamination (on the side of face F2) and second interlayer (on the side of face F3), laminations of identical or different thicknesses, etc.
  or even particularly on the side of face Fa particularly anchored on face Fa The heating wire or wires particularly have a thickness less than or equal to 0.1 mm preferably made of copper, tungsten, gold, silver or aluminum or alloys of at least two of these metals.

The wire or wires are advantageously very thin so as not to impair, or only very slightly impair, the transparency of the glazing. Preferably, the metal wires have a thickness less than or equal to 0.1 mm, in particular between 0.02 and 0.04 mm and ideally between 0.024 mm and 0.029 mm. The metal wire or wires preferably contain copper, tungsten, gold, silver or aluminum or an alloy of at least two of these metals. The alloy can also contain molybdenum, rhenium, osmium, iridium, palladium or platinum.

The metal wire or wires are preferably electrically insulated.

In one embodiment, the glazing according to the invention comprises a functional element bonded to the lamination interlayer:
  on one of faces Fa or Fb of the lamination interlayer (single or multi-laminations)
  or within said lamination interlayer, between a first sheet and second interlayer sheet.

The functional element (flexible, curved) of submillimetric thickness comprising a (flexible) polymer sheet of submillimetric thickness, particularly of at most 200 µm or 100 µm, particularly conductive polymer, and optionally on the polymer sheet (on a first main face oriented on face F2 or F3 side), a coating, particularly electrically conductive coating (transparent in the visible range) particularly forming said above-mentioned local heating layer or a camouflaging coating (such as said above-mentioned selective filter) or an element that is opaque—in the visible range and at the working wavelength—(opaque polymer film or camouflaging coating on the polymer sheet).

The functional element has a first zone facing the through-hole, particularly a local heating element or selective filter, preferably with the electrically conductive coating.

Said functional element, particularly a heating element, is transparent at the working wavelength in the infrared at least in the zone facing the through-hole.

Said functional element thus taking up a surface encompassing the through-hole, the optional (electrically conductive) coating is optionally absent or protruding by at most 1 cm, 5 mm or 3 mm (from the walls) of the through-hole.

It is possible to envisage a functional element that is opaque at the working length (film and/or coating on top) outside the zone of the through-hole (and of the optional other zone of the other through-hole).

Outside the zone of the through-hole (and of the optional other zone of the other through-hole), this functional (heating) element is for example opaque or made opaque in the visible range. For example it extends a peripheral masking layer (enamel for example) particularly on face F2 or on the interlayer (ink) which is a strip in order to create (viewed from the outside a widened opaque zone particularly in the central zone.

This functional element can be local, in the region of the through-hole (taking up a fraction of the glazing surface) and can take up less than 30, 10%, 5% of the glazing.

The functional element can have any general rectangular or square shape, identical and even homothetic to the shape of the through-hole.

The distance between the upper longitudinal edge and the functional element can be at most 30 mm, 20 mm 15 and even 10 mm.

In particular:
the functional element (the sheet) comprises, on the first main face orient on face F2 or F3 side, an electrically conductive coating forming a (local) heating layer facing the through-hole, thereby defining a local heating zone
and/or the functional element (the sheet) comprises, on the first main face or the opposite second main face, a camouflaging coating facing the through-hole and even protruding under face F3 or an opaque masking element (bonded opaque film or coating) at least partially offset (absent from the center) from the through-hole, particularly absent from, or protruding by at most 50 mm into, the through-hole.

The opaque zone of the opaque element can take up substantially the entire surface of the functional element, or at least 80% or 90% and with an opening in line with the through-hole. The dimensions of the opening can be smaller, equal to or greater than those of the through-hole.

The opaque masking element (bonded opaque film or coating) can protrude into the through-hole particularly by at most 50 mm, 20 mm, 10 mm and even by at least 5 mm, 7 mm, 2 mm.

The busbars (horizontal or lateral, etc.) are on the polymer sheet optionally under or on the opaque masking element (on the same first face, for example oriented toward face Fb) or spaced apart from the masking element (on the same first face, for example oriented toward face Fb or on the second main face).

For example, the polymer film comprises an electrically conductive coating present at least facing the through-hole for example with a shape homothetic to the hole (trapezoidal).

The electrically conductive coating (heating or not) can also take up substantially the entire surface of the polymer film or at least 70%, 80%. The optional busbars bonded to the conductive coating are outside the first zone but in the vicinity, preferably for example at less than 1 cm.

The electrically conductive coating can be oriented toward face F2 or on the side of the through-hole. Its thickness can be sub-micronic. This is single or multilayered, particularly mineral.

The functional element can have a shape (trapezoidal, rectangular) etc. with rounded corners.

The polymer sheet of the functional element can be a plastic film particularly with a thickness of between 10 and 100 μm. The plastic film can more broadly be made of polyamide, polyester, polyolefin (PE: polyethylene, PP: polypropylene), polystyrene, polyvinyl chloride (PVC), polyethylene terephthalate (PET), polymethyl methacrylate (PMMA) or polycarbonate (PC). A clear film is preferred, in particular PET.

Use may be made, for example, of a coated clear PET film, for example XIR from the company Eastman, a coextruded film made of PET-PMMA, for example like SRF 3M®, but also numerous other films (for example made of PC, PE, PEN, PMMA, PVC).

The functional element (the polymer sheet) can comprise on the first main face (on the side of the electrically conductive coating or on the opposite side) or a face opposite one or more other elements in particular moisture sensors, rain sensor, light sensor (photodiode), sensor forming an antenna, for receiving and/or transmitting electromagnetic waves (radio, TV, particularly a local communication network such as BLUETOOTH, WIFI, WLAN), an acoustic sensor (based on a piezoelectric element), an ultrasound signal detector, a diagnostic sensor, a command detector (windscreen wiper etc.), for example IR command or voice command (piezoelectric), an electroluminescent screen (organic or inorganic, liquid crystal, etc.).

The number of openings of the opaque functional element is adapted according to the number of sensors and camera, screen(s), requiring it.

Moreover, cumulatively or alternatively to the functional element bonded to the interlayer, the glazing can comprise, on face F2, a functional film adhesively bonded to face F2 (by for example pressure-sensitive glue or preferably a functional coating of submillimetric thickness, particularly of at most 200 μm or 100 μm, functional element (functional coating) with a first zone facing the through-hole, functional element (functional coating) transparent at least the "working" wavelength in the infrared at least in the first zone, particularly heating coating or preferably camouflaging coating forming a selective filter (such as that mentioned above).

The functional element (functional coating) on face F2 can be local, in the region of the through-hole and take up less than 30, 10%, 5% of the glazing.

The functional element (functional coating) on face F2 can have any rectangular or square general shape, identical and even homothetic to the shape of the through-hole.

The functional element on face F2 can be a coating which:
is spaced apart from an adjacent layer on face F2, in particular opaque masking layer (black, enamel) with a gap in line with the through-hole,
or covers or is under, over less than 5 cm, or 1 cm, an adjacent layer on face F2 in particular an opaque masking layer (particularly black, enamel or others) with a gap in line with the through-holes.

As already mentioned, the glazing can comprise, between face F2 and Fa, an opaque masking layer particularly an enamel (black etc.) on face F2 and/or on face Fa (in particular on Fa an ink, particularly black, etc.), at the edge of the through-hole between face F2 and Fa, in particular on the peripheral zone and even central and preferably along the longitudinal edge of the glazing.

The masking layer is for example on face F2 and the camouflaging coating is on the masking layer or under the masking layer and/or the masking layer is on face Fa and the camouflaging coating on face F2 is in contact with the masking layer.

The masking layer can then have a gap in line with said through-hole (at least in the central zone) and preferably which protrudes by at most 50 mm, mm or 20 mm or 10 mm, 7 mm or 5 mm in said through-hole.

This masking layer masks the infrared vision system and/or for example its casing.

A masking layer can be a printed layer on the lamination interlayer for example on the PVB.

The opaque masking layer is preferably a continuous layer (flattened with a solid edge or alternatively a gradient edge (set of patterns).

The masking layer can be at 2 mm or 3 mm (less than 5 mm) from the edge face of the glazing (closest).

The masking layer can be a band framing the glazing (windscreen etc.) particularly in black enamel. A gap is thus created in this masking layer.

Another masking layer (particularly black enamel etc.) can be on face F3 or F4 particularly facing toward the masking layer (and even of identical nature, for example a particularly black enamel).

More broadly speaking, the glazing can thus comprise, on face F2 (or on face F3 or else on a polymer film between face F2 and F3) a functional (athermal) layer, extending over all or part of the glazing, particularly a transparent (in the visible range) electrically conductive, optionally heating layer, in particular a silver stack, or else an opaque masking layer, particularly an enamel, functional layer which absorbs at the working wavelength in the infrared, and which is absent from said through-hole at least in the central zone and at the edge of the through-hole between face F2 and Fa, particularly by means of a gap and/or a functional coating is on face F2, transparent at the working wavelength, is facing the through-hole, particularly local heating layer (as mentioned above) or camouflaging coating forming selective filter (as mentioned above), optionally being in contact with said functional layer, particularly on or under the functional layer The functional layer can then have a gap in line with said through-hole (at least in the central zone) and preferably which protrudes by at most 50 mm, 30 mm or 20 mm or 10 mm, 7 mm or 5 mm in said through-hole.

The transparent electrically conductive functional layer (solar control and/or heating) can comprise a stack of thin layers comprising at least one metal functional layer such as silver (on F2 or preferably F3 or on a polymer film). The or each functional (silver) layer is arranged between dielectric layers.

The functional layers preferably contain at least one metal, for example, silver, gold, copper, nickel and chromium or, or a metal alloy. The functional layers in particular preferably contain at least 90% by weight of metal, in particular at least 99.9% by weight of metal. The functional layers can be made of metal for the metal alloy. The functional layers contain in a particularly preferred manner silver or an alloy containing silver. The thickness of a functional layer (silver, etc.) is preferably from 5 nm to 50 nm, more preferentially from 8 nm to 25 nm. A dielectric layer contains at least one individual layer made of a dielectric material, for example, containing a nitride such as silicon nitride or an oxide such as aluminum oxide. The dielectric layer can however also contain a plurality of individual layers, for example, individual layers of a dielectric material, layers, smoothing layers, which corresponds to blocking layers and/or "anti-reflective" layers. The thickness of a dielectric layer is, for example, from 10 nm to 200 nm. This layer structure is generally obtained by a series of deposition operations that are carried out by a vacuum process such as field-supported magnetic cathode sputtering.

The transparent electrically conductive layer is a layer (single-layer or multi-layer, thus a stack) preferably with a total thickness less than or equal to 2 µm, in a particularly preferred way less than or equal to 1 µm.

Naturally, the most desirable application is that the glazing be a windscreen for a road vehicle (automobile) or even for a rail vehicle (moderate speed).

For the glass of the first glass sheet and/or of the second glass sheet, preferably a soda-lime-silica type glass is used.

The interior and/or exterior glass may have undergone a chemical or heat treatment of the hardening or annealing type or may have undergone tempering (particularly in order to obtain better mechanical strength) or can be semi-tempered.

The glass of the first glass sheet and/or of the second glass sheet is preferably of the float glass type, that is to say obtainable by a method consisting in pouring molten glass onto a bath of molten tin (called a "float" bath). The terms "atmosphere" and "tin" faces are understood to mean those faces that have been in contact with the atmosphere in the float bath and in contact with the molten tin respectively. The tin face contains a small surface amount of tin that has diffused into the structure of the glass.

The same applied for the piece which can be made of float glass. The interior surface (with a reflective element, coating, etc.) can equally be the "tin" face or the "atmosphere" face.

Furthermore, in order to quantify the transmission of the glass in the visible range, a light transmission factor, referred to as light transmission, is often defined, often abbreviated to "$T_L$", calculated between 380 and 780 nm and applied to a glass thickness of 3.2 mm or 4 mm, according to standard ISO 9050:2003, thus taking into account the illuminant D65 as defined by standard ISO/CIE 10526 and the C.I.E 1931 standard colorimetric observer as defined by standard ISO/CIE 10527.

Naturally, the light transmission $T_L$ of the laminated glazing in a zone without a hole (central zone of the windscreen) is preferably of at least 70% or 75%, 80% or 85%, 88%.

The second glass sheet is particularly green, blue, gray. The second glass sheet can be green by the $Fe_2O_3$ or blue with CoO and Se or gray with Se and CoO.

The glasses of the applicant called TSAnx (0.5 to 0.6% iron) TSA2+, TSA3+(0.8 to 0.9% iron), TSA4+(1% iron), TSA5+, for example green, can be particularly mentioned.

TSA3+ (2.1 mm) for example has a total transmission at 905 mm of about 40% and at 1550 mm of about 50%.

The second glass sheet can have a redox, defined as being the ratio between the content by weight of FeO (ferrous iron) and the total iron oxide content by weight (expressed in the form $Fe_2O_3$) between 0.22 and 0.35 or 0.30.

Said second glass sheet can have a chemical composition that comprises the following constituents in a content varying within the limits by weight defined hereinafter:

| | |
|---|---|
| $SiO_2$ | 64-75% |
| $Al_2O_3$ | 0-5% |
| $B_2O_3$ | 0-5%, |
| CaO | 2-15% |
| MgO | 0-5% |
| $Na_2O$ | 9-18% |
| $K_2O$ | 0-5% |
| $SO_3$ | 0.1-0.35% |
| $Fe_2O_3$ (total iron) | at least 0.4% and even 0.4 to 1.5%, |
| Optionally redox | 0.22-0.3 |

And particularly less than 0.1% impurities.

The first glass sheet can for example be a soda-lime-silica glass such as Saint-Gobain Glass's Diamant®, or Pilkington's Optiwhite®, or Schott's B270®, or AGC's Sunmax® or of other composition described in document WO04/025334. The Planiclear® glass from the Saint-Gobain Glass company can also be chosen.

The laminated glazing according to the invention, in particular for a private car (windscreen etc.) or truck, can be curved (bent) in one or more directions particularly with, for the first sheet, the second sheet and optionally the piece, a radius of curvature of 10 cm to 40 cm. It can be flat for buses, trains, tractors.

With ordinary natural raw materials, the total content by weight of iron oxide is of the order of 0.1% (1000 ppm). To reduce the iron oxide content, particularly pure raw materials can be selected.

In the present invention, the $Fe_2O_3$ content (total iron) of the first glass sheet is preferably less than 0.015%, even less than or equal to 0.012%, particularly 0.010%, in order to increase the near-infrared transmission of the glass. The $Fe_2O_3$ content is preferably greater than or equal to 0.005%, particularly 0.008% so that the cost of the glass is not a disadvantage.

In order to further increase the infrared transmission of the first glass sheet, the ferrous iron content can be reduced in favor of the ferric iron, thus oxidizing the iron present in the glass. Thus, the desire is for glasses having the lowest possible redox, ideally zero or nearly 0. This number can vary between 0 and 0.9 of zero redoxes corresponding to a totally oxidized glass.

Glasses comprising low quantities of iron oxide, particularly less than 200 ppm, even less than 150 ppm, have a natural tendency to have high redoxes, greater than 0.4, even 0.5. This tendency is probably due to the displacement of the oxidation-reduction equilibrium of the iron based on the content of iron oxide. The redox of the first glass sheet is preferably greater than or equal to 0.15, and particularly between 0.2 and 0.30, particularly between 0.25 and 0.30. In fact, excessively low redoxes contribute to reducing the working life of the furnaces.

In the glasses according to the invention (first and second sheet and even the piece), the silica $SiO_2$ is generally maintained within narrow limits for the following reasons. Above 75%, the viscosity of the glass and its aptitude for devitrification increase greatly, which makes its melting and pouring onto the molten tin bath more difficult. Below 60%, particularly 64%, the hydrolytic resistance of the glass decreases rapidly. The preferred content is between 65 and 75%, particularly between 71 and 73%.

Said first glass sheet can have a chemical composition that comprises the following constituents in a content varying within the limits by weight defined hereinafter:

| | |
|---|---|
| $SiO_2$ | 60-75% |
| $Al_2O_3$ | 0-10% |
| $B_2O_3$ | 0-5%, preferably 0 |
| CaO | 5-15% |
| MgO | 0-10% |
| $Na_2O$ | 5-20% |
| $K_2O$ | 0-10% |
| BaO | 0-5%, preferably 0, |
| $SO_3$ | 0.1-0.4% |
| $Fe_2O_3$ (total iron) | 0 to 0.015%, |
| and redox | 0.1-0.3. |

Throughout the text, the percentages are percentages by weight.

In addition, the piece can have a chemical composition that comprises the following constituents in a content varying within the limits by weight defined hereinafter:

| | |
|---|---|
| $SiO_2$ | 60-75% |
| $Al_2O_3$ | 0-10% |
| $B_2O_3$ | 0-5%, preferably 0 |
| CaO | 5-15% |
| MgO | 0-10% |
| $Na_2O$ | 5-20% |
| $K_2O$ | 0-10% |
| BaO | 0-5%, preferably 0, |
| $SO_3$ | 0.1-0.4% |
| $Fe_2O_3$ (total iron) | 0 to 0.015%, |
| and redox | 0.1-0.3. |

The glass sheets are preferably formed by floating on a tin bath. Other types of forming methods can be used, such as drawing methods, down-draw method, lamination method, Fourcault method, etc.

The glass composition of the first glass sheet can comprise, other than the inevitable impurities contained particularly in the raw materials, a small proportion (up to 1%) of other constituents, for example agents aiding in the melting or refining of the glass (Cl . . . ), or still elements resulting from the dissolving of the refractories used in the construction of the furnaces (for example $ZrO_2$). For the reasons already mentioned, the composition according to the invention preferably does not comprise oxides such as $Sb_2O_3$, $As_2O_3$ or $CeO_2$.

The composition of the first glass sheet preferably does not comprise any infrared absorbing agent (particularly for a wavelength comprised between 800 and 1800 nm). In particular, the composition according to the invention preferably does not contain any of the following agents: oxides of transition elements such as CoO, CuO, $Cr_2O_3$, NiO, $MnO_2$, $V_2O_5$, rare earth oxides such as $CeO_2$, $La_2O_3$, $Nd_2O_3$, $Er_2O_3$, or coloring agents in elemental state such as Se, Ag, Cu. Among the other agents also preferably excluded are oxides of the following elements: Sc, Y, Pr, Sm, Eu, Gd, Tb, Dy, Ho, Tm, Yb, Lu. These agents often have a very powerful undesirable coloring effect, appearing at very small quantities, sometimes on the order of a few ppm or less (1 ppm=0.0001%). Their presence thus very greatly reduces the transmission of the glass.

Preferably, the first glass sheet (and even the piece) has a chemical composition that comprises the following constituents in a content varying within the limits by weight defined hereinafter:

| | |
|---|---|
| $SiO_2$ | 60-75% |
| $Al_2O_3$ | 0-10% |
| $B_2O_3$ | 0-5%, preferably 0 |
| CaO | 5-15% |
| MgO | 0-10% |
| $Na_2O$ | 5-20% |
| $K_2O$ | 0-10% |
| BaO | 0-5%, preferably 0, |
| $SO_3$ | >0.2-0.4% |
| $Fe_2O_3$ (total iron) | 0 to 0.015%, |
| And redox | 0.2-0.30. |

The first glass sheet (and even the piece) can have a chemical composition that comprises the following constituents in a content varying within the limits by weight defined hereinafter:

| | |
|---|---|
| $SiO_2$ | 60-75% |
| $Al_2O_3$ | 0-10% |
| $B_2O_3$ | 0-5%, preferably 0 |
| CaO | 5-15% |
| MgO | 0-10% |
| $Na_2O$ | 5-20% |

|  |  |
| --- | --- |
| K$_2$O | 0-10% |
| BaO | 0-5%, preferably 0, |
| SO$_3$ | 0.1-0.4% |
| Fe$_2$O$_3$ (total iron) | 0 to 0.02%, |
| And redox | 0.15-0.3. |

In the present invention, the Fe$_2$O$_3$ content (total iron) is preferably less than 0.015%, even less than or equal to 0.012%, particularly 0.010%, in order to increase the near infrared transmission of the glass. The Fe$_2$O$_3$ content is preferably greater than or equal to 0.005%, particularly 0.008%, so that the cost of the glass (of the second glass sheet and the piece) is not a disadvantage.

The redox is preferably greater than or equal to 0.15, and particularly between 0.2 and 0.30, particularly between 0.25 and 0.30. In fact, excessively low redoxes contribute to reducing the working life of the furnaces.

In the glasses according to the invention (first sheet, second sheet and even the piece), the silica SiO$_2$ is generally maintained within narrow limits for the following reasons. Above 75%, the viscosity of the glass and its aptitude for devitrification increase greatly, which makes its melting and pouring onto the molten tin bath more difficult. Below 60%, particularly 64%, the hydrolytic resistance of the glass decreases rapidly. The preferred content is between 65 and 75%, particularly between 71 and 73%.

Other preferred compositions according to the invention for the first glass sheet, indeed even for the piece, are reproduced hereinafter:

|  |  |
| --- | --- |
| SiO$_2$ | 65-75% |
| Al$_2$O$_3$ | 0-3% |
| CaO | 7-12% |
| MgO | 2-5% |
| Na$_2$O | 10-15% |
| K$_2$O | 0-5% |
| SO$_3$ | 0.1-0.3% |
| Fe$_2$O$_3$ (total iron) | 0 to less than 0.015%, |
| And redox | 0.1-0.3. |

Other preferred compositions according to the invention for the first glass sheet, indeed even for the piece, are reproduced hereinafter:

|  |  |
| --- | --- |
| SiO$_2$ | 65-75% |
| Al$_2$O$_3$ | 0-5% |
| CaO | 7-12% |
| MgO | 1-5% |
| Na$_2$O | 10-15% |
| K$_2$O | 0-5% |
| SO$_3$ | 0.2-0.4% |
| Fe$_2$O$_3$ (total iron) | 0 to less than 0.015%, |
| And redox | 0.1-0.3. |

The invention also relates to a device, which comprises:
the laminated glazing as previously described
an infrared vision system at a working wavelength in the infrared (or even multi-spectral, also in the visible range, particularly between 500 and 600 nm), arranged in the passenger compartment behind said glazing and comprising a transmitter and/or receiver, so as to transmit and/or receive radiation passing through the first glass sheet at the through-hole.

The infrared vision system (LIDAR) can be of different technologies. It makes it possible to measure the vehicle's environment by determining the distance of the object closest to the vehicle in a wide range of angular directions. Thus, the vehicle's environment can be reconstituted in 3D. The technology employed is based on sending a light beam and receiving it after it has diffusely reflected off an obstacle. This can be done by a rotating source, scanned by microelectromechanical systems (MEMS) or by a fully solid system. A single flash of light can thus illuminate the whole environment.

For all these technologies, the light must pass through the glazing twice, when outgoing and when incoming, which explains the necessity to have a glazing with excellent transparency at the working wavelength of the LIDAR.

The speed can also be measured with DOPPLER technology.

The infrared vision system (LIDAR) is preferably spaced apart from the anti-reflective element.

The piece according to the invention is preferably spaced apart from the infrared vision system (LIDAR) and/or does not serve for the attachment of same. The infrared vision system (LIDAR) can be facing or offset from said through-hole (and from the piece), for example an optical system is between the piece and the infrared vision system (LIDAR).

The infrared vision system (LIDAR) is for example attached via face F4 and/or the bodywork, the roof trim. The infrared vision system (LIDAR) can be offset.

The infrared vision system (LIDAR) is for example integrated in a plate or a multifunction base able to (designed to) optimize the positioning thereof relative to the windscreen and the piece by being adhesively bonded to face F4.

Some advantageous but non-limiting embodiments of the present invention are described hereafter, which of course can be combined as appropriate. The views are not to scale.

FIG. 1 shows a schematic sectional view of a windscreen 100a in a first embodiment of the invention with an infrared vision system such as a LIDAR.

FIG. 3 shows schematically in cross sectional view a windscreen 200 according to the invention with an infrared vision system such as a LIDAR in a second embodiment of the invention.

FIG. 5a shows a schematic sectional view of a windscreen 300 according to the invention with an infrared vision system such as a LIDAR in a third embodiment of the invention.

FIG. 5b shows a schematic front view (passenger compartment side) of this windscreen 300.

FIG. 6 shows schematically in cross sectional view a windscreen 400 according to the invention with an infrared vision system such as a LIDAR in a fourth embodiment of the invention.

FIG. 7 shows a schematic front view (passenger compartment side) of this windscreen 400.

FIG. 8 shows schematically in cross sectional view a windscreen 500 according to the invention, with an infrared vision system such as a LIDAR in a fifth embodiment of the invention.

FIG. 11 shows a schematic sectional view of a windscreen 600 according to the invention, with an infrared vision system such as a LIDAR in a sixth embodiment of the invention.

FIG. 12 shows a schematic sectional view of a windscreen 700 according to the invention, with an infrared vision system such as a LIDAR in a seventh embodiment of the invention.

FIG. 17 is a schematic sectional view showing the bending of a piece according to the invention simultaneously to the bending of the first and second glass sheets.

FIG. 1 shows schematically a windscreen of a vehicle particularly a motor vehicle 100a according to the invention, with an infrared vision system such as a LIDAR at 905 nm or 1550 nm comprising a transmitter/receiver 7.

Figure 2A:
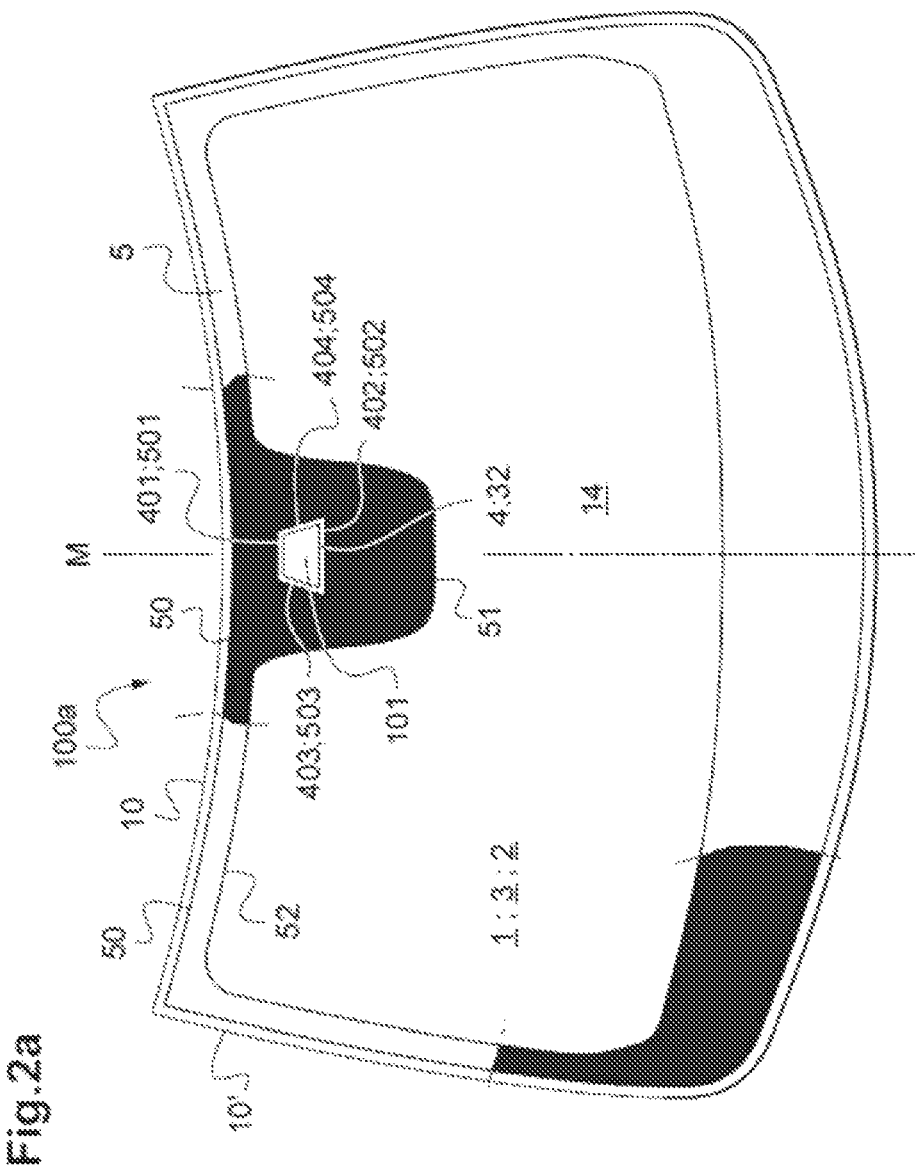
FIG. 2a shows a schematic front view (passenger compartment side) of the windscreen 100a of the first embodiment of the invention.

This vision system 7 is placed behind the windscreen facing a zone that is preferably located in the central and upper part of the windscreen. In this zone, the infrared vision system is oriented at a certain angle with respect to the surface of the windscreen (face F4 14). In particular, the transmitter/receiver 7 can be oriented directly toward the image capture zone, in a direction that is nearly parallel to the ground, that is to say slightly inclined toward the road. In other words, the transmitter/receiver 7 of the LIDAR can be oriented toward the road at a slight angle with a field of vision suitable for fulfilling their functions.

As a variant, the receiver 7 is separate from the transmitter, particularly adjacent.

The windscreen 100a is a curved laminated glazing comprising:
an external glass sheet 1, with an exterior face F1 and an interior face F2
and an internal glass sheet 2, for example with a thickness of 1.6 mm or even less, with an exterior face F3 and an interior face F4 on the passenger compartment side
the two glass sheets being bonded to one another by an interlayer made of thermoplastic material 3 (single or multi-laminations), most usually polyvinyl butyral (PVB), preferably clear, of sub-millimetric thickness optionally having a cross section decreasing in the shape of a wedge from the top to the bottom of the laminated glazing, for example a PVB (RC41 from Solutia or Eastman) with a thickness of about 0.76 mm, or as a variant if necessary an acoustic PVB (three-layer or four-layer), for example with a thickness of about 0.81 mm, for example an interlayer in three PVB laminations, PVB with a main internal face 31 and a main face 32.

The windscreen of a road vehicle in particular is curved.

In a conventional and well-known way, the windscreen is obtained by hot lamination of the first, second curved glass sheets 1, 2 and the interlayer 3. For example a clear PVB of 0.76 mm is selected.

The first glass sheet 1, particularly silica-based, soda-lime-based, soda-lime-silica-based (preferably), alumino-silicate-based, or borosilicate-based, has a total iron oxide content by weight (expressed in the form $Fe_2O_3$) of at most 0.05% (500 ppm), preferably of at most 0.03% (300 ppm) and at most 0.015% (150 ppm) and particularly greater than or equal to 0.005%. The first glass sheet can preferably have a redox greater than or equal to 0.15, and particularly between 0.2 and 0.30, particularly between 0.25 and 0.30. Particularly an OPTWHITE glass of 1.95 mm is selected.

The second glass sheet 2 particularly silica-based, soda lime-based, preferably soda-lime-silica-based (like the first glass sheet), even aluminosilicate-based or borosilicate-based, has a total iron oxide content by weight of at least 0.4% and preferably of at most 1.5%.

The glasses of the applicant called TSAnx (0.5 to 0.6% iron) TSA2+, TSA3+(0.8 to 0.9% iron), TSA4+(1% iron), TSAS+, for example green, can be particularly mentioned. For example a TSA3+ glass of 1.6 mm is selected.

According to the invention, in a central peripheral region along the upper longitudinal edge 10, the windscreen 100a comprises:
a through-hole 4, here closed, of the second glass sheet 2, which hole 4 is thus delimited by a wall of the glass 401 to 404
optionally in a variant with transmitter and separate receiver, close to the through-hole (which is for the receiver), another closed through-hole of the second glass sheet 2 (which is for the transmitter).

A central line M is defined passing through the middle of the upper edge which can be an axis of symmetry of the glazing.

The through-hole 4 can be central; then the line M passes through and divides it into two identical parts.

As shown in FIGS. 1a and 2a (sectional view along M), the through-hole is here a closed hole (surrounded by the wall of the glass sheet), thus within the glazing particularly—with trapezoidal cross section—comprising:
a first large side 401 or "upper" longitudinal edge closest to the edge face of the upper longitudinal edge of the glazing 10—parallel to this edge face—with a length of at most 20 cm for example 8 cm and spaced apart by at least 5 cm or 6 cm from the edge face 10
a second large side 402 or "lower" longitudinal edge (farthest from the edge face of the upper longitudinal edge 10, near the central zone) parallel to the first large side with a length of at most 25 cm or 20 cm and preferably greater than that of the first large side for example 14 cm,
first and second small sides 403, 404, or oblique lateral edges.

The height (between the large sides 401, 402) is at least 5 cm, here 6 cm.

The other hole may be of the same size and the same shape. For example, they are two horizontal holes.

Figure 2B:
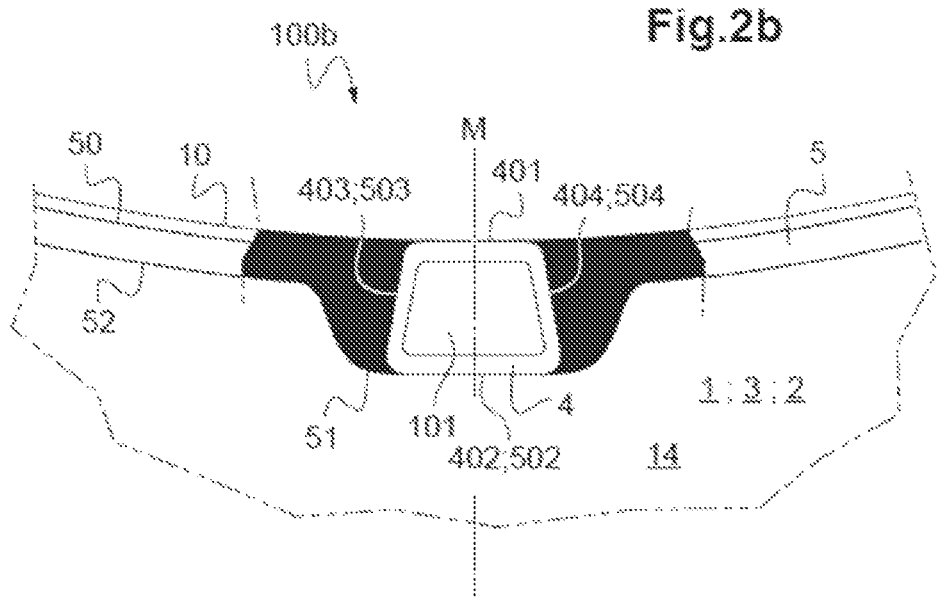
FIG. 2b shows a schematic front view (passenger compartment side) of the windscreen 100b in a first variant of the first embodiment of the invention.
Figure 2C:
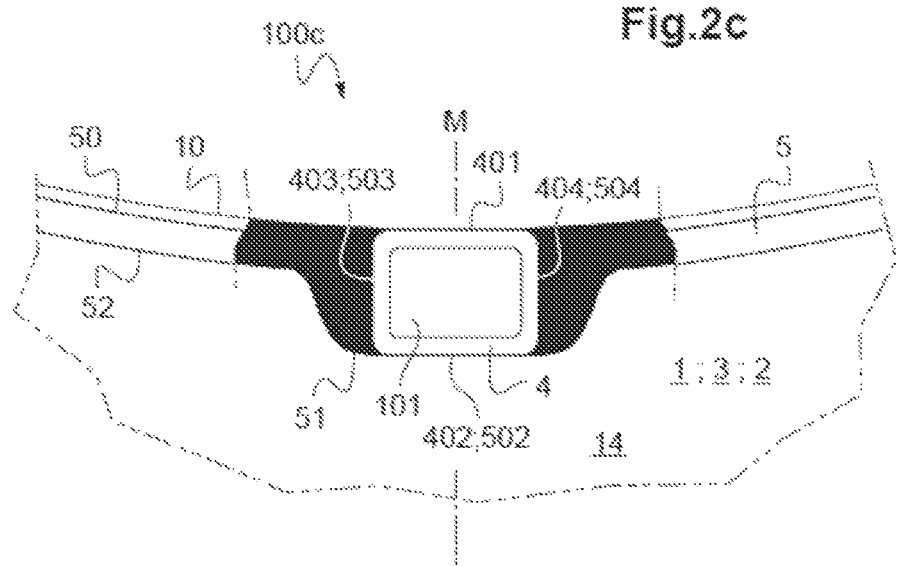
FIG. 2c shows a schematic front view (passenger compartment side) of the windscreen 100b in a second variant of the first embodiment of the invention.

As shown in FIGS. 2*b* and 2*c*, the through-hole 4 can alternatively be a notch, for example of trapezoidal shape (FIG. 2*b*) or rectangular shape (FIG. 2*c*), thus a through-hole which preferably opens on the roof side (on the upper longitudinal edge 10).

The through-hole can have rounded corners (FIGS. 2*b* and 2*c*).

The closed or opening through-hole 4 can be in another region of the windscreen 100*a* or even in another glazing of the vehicle, in particular the rear window.

The windscreen 100*a* comprises on face F2 12 an opaque masking layer for example black 5, such as a layer of enamel or a lacquer, forming a peripheral frame of the windscreen (or of the window) particularly along the upper longitudinal edge 10 of the glazing and particularly along the left lateral edge 10' of the glazing.

The external edge 50 of the masking layer 5 closest to the edge face of the glazing can be spaced apart by 1 or 2 mm to several cm from the edge face 10 (longitudinal edge).

The opaque masking layer 5 here has a greater width in the central zone than in the other peripheral zones, on either side of the central zone. The masking layer 5 has an internal (longitudinal) edge 51 in the central zone of the windscreen and an internal (longitudinal) edge 52 on either side of the central zone.

This central zone being provided with the closed hole 4 (FIG. 2*a*), this masking layer 5 comprises:
  in line with the first hole 4, a first gap that is large enough not to disrupt the performance of the transmitter/receiver (or of the separate receiver) 7, particularly slightly smaller than the through-hole 4
  where appropriate, in the variant, in line with the other hole, a second gap that is large enough not to disrupt the performance 7 separate transmitter, particularly slightly smaller than the other through-hole.

The first gap here has the same trapezoidal shape as the hole 4 with two large sides 501, 502 and two small sides 503, 504. The first gap can be preferably of identical size or smaller than the hole 4 for example the walls 501 to 504 delimiting the first gap protruding by at most 50 mm or 10 mm or even 5 mm from the walls of the glass 401 to 404. As a variant, this is a rectangle or any other shape particularly inscribed in the surface of the through-hole (trapezoidal or another).

The masking layer 4 is capable of masking the casing 8 (plastic, metal, etc.) of the LIDAR 7. The casing 8 can be adhered to face F4 14 by an adhesive 6 and to the roof 80. The casing may be attached to a plate 8' mounted on face F4, with holes to allow said IR rays to pass.

The windscreen 100*a* can comprise a set of metal wires that are almost invisible, for example of 50 μm, which are placed in or on a face of the lamination interlayer 3 (over the entire surface), for example face Fb 32 on the side of F3, in the form of lines that are optionally straight. Here, these almost-invisible metal wires are absent in line with the through-hole 4.

In the through-hole and optionally under the through-hole (under face F3) and/or flush over face F4, a piece 9 is present, made of mineral material (particularly glass or glass ceramic) which is transparent at least at the "working" wavelength in the infrared of the LIDAR in a range extending from 800 nm to 1800 nm, in particular from 850 nm to 1600 nm, particularly 905±nm and/or 1550±30 nm.

The piece 9 has a main "bonding" surface 91, in particular naked or coated with a functional layer, here (and preferably) bonded to the main face Fb with adhesive contact, and a main "interior" surface 92 opposite the bonding surface.

The interior surface comprising an element which is anti-reflective at said working wavelength, for example an anti-reflective porous silica coating 110 nm thick.

The piece 9 preferably has a thickness of at least 0.1 mm or even 0.3 mm and better still if necessary (for mechanical strength etc.) of at least 0.7 mm and preferably of at most 3 mm, particularly a piece with a size (width and/or surface area) smaller than the through-hole, The piece 9 has an edge face in contact with or spaced apart from the wall 401, 402 delimiting the through-hole by at most 5 mm, preferably spaced apart and by a distance of at most 2 mm and even ranging from 0.3 to 2 mm.

The piece is for example an extraclear glass from 0.5 to 3 mm, soda-lime-silica, curved and thermally tempered.

The first glass sheet 1 and the piece 9 can be an OPTIWHITE® of 1.95 mm.

The piece is alternatively a flexible extraclear curved glass of 0.5 mm or 0.7 mm and optionally chemically tempered.

For example, it is Gorilla® glass.

Figure 4:
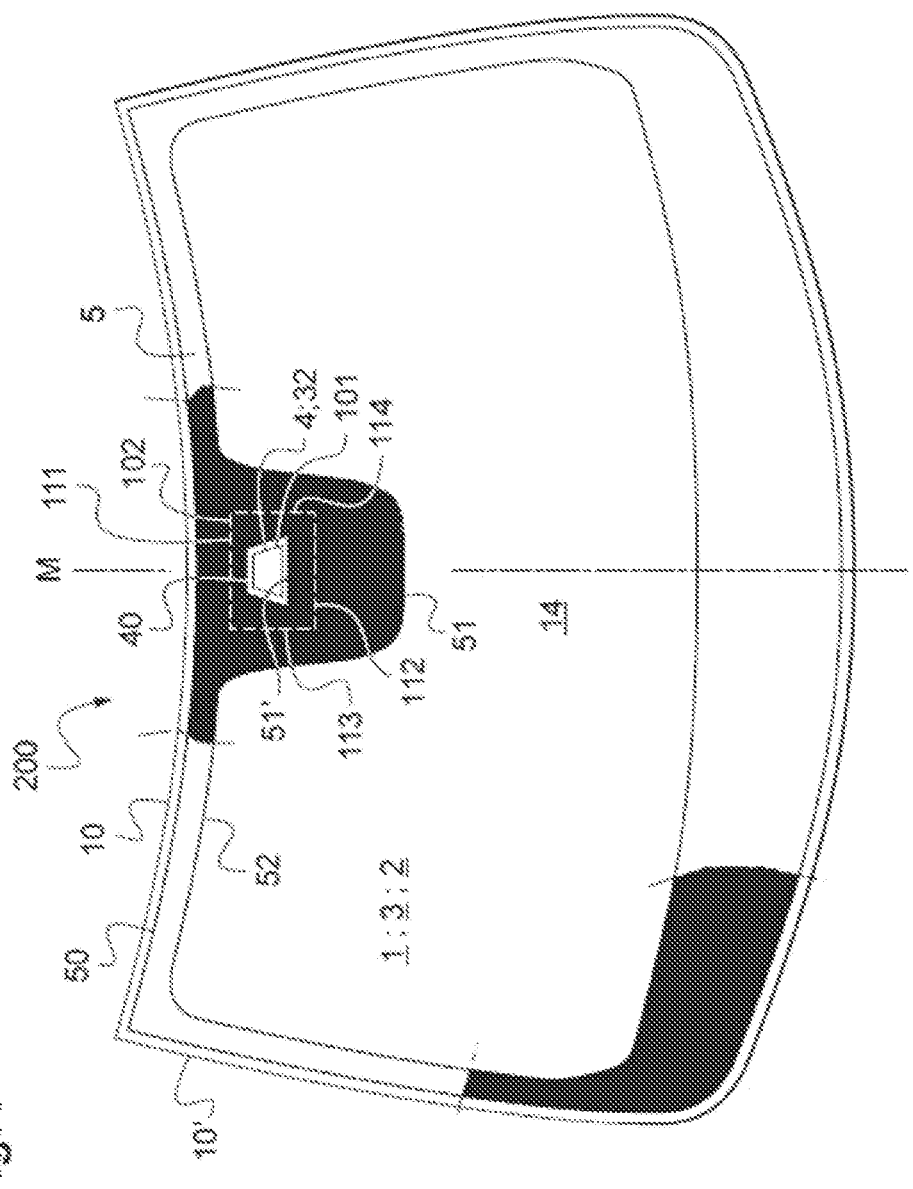
FIG. 4 shows a schematic front view (passenger compartment side) of this windscreen 200.

FIG. 3 shows schematically in cross sectional view a windscreen 200 according to the invention with an infrared vision system such as a LIDAR in a second embodiment of the invention. FIG. 4 shows a schematic front view (passenger compartment side) of this windscreen 200.

Only the differences with the first embodiment are explained hereunder.

The piece 9 is a flexible curved glass of preferably at least 0.1 mm, for example 0.3 mm or 0.5 mm or 0.7 mm, extraclear and optionally tempered.

The first glass sheet comprises, on face F2, a camouflaging coating 110 which is transparent at the working wavelength in the infrared and absorbs in the visible range.

The camouflaging coating 110 is rectangular in shape (longitudinal edges 111, 112 and lateral edges 113, 114) in this peripheral region (dashed line in FIG. 4 as not visible)

The edges 111 to 114 of the camouflaging coating optionally protrude between face F2 12 and face Fa 31 for example at most by 10 mm or 5 mm from the walls 401 to 404 delimiting the through-hole 4. Here, the camouflaging coating 110 is on face F2 and partially covers the optional masking layer 5 on face F2.

The camouflaging coating 110 alternatively has another shape, for example a shape homothetic to that of the section of the through-hole, thus for example a trapezoidal shape.

Possible variants are as follows (without being exhaustive), optionally cumulative:
  the camouflaging coating 110 does not protrude from the through-hole and even is spaced apart from the edge of the through-hole, preferably by at most 1 cm or 5 mm
  the camouflaging coating 110 is spaced apart from the masking layer (for example which is on face F2 particularly of the enamel) or at least does not cover it.

FIG. 5*a* shows a schematic sectional view of a windscreen 300 according to the invention with an infrared vision system such as a LIDAR in a third embodiment of the invention. FIG. 5*b* shows a schematic front view (passenger compartment side) of this windscreen 300.

Only the differences with the first embodiment are explained hereunder.

The lamination interlayer 3, for example made of two PVB sheets 33, 34, has a partial interlayer hole in line with the through-hole 4 (for example full hole on the sheet 34, on face F3 side).

The interlayer hole may preferably be identical in size to, or wider than, the hole 4 and even optionally is a closed partial interlayer hole in the thickness of the lamination interlayer 3 delimited by an interlayer wall 301 to 304.

The interlayer hole here has the same trapezoidal shape as the hole 4 with two large sides 301, 302 and two small sides 303, 304. The interlayer hole can preferably be identical in size to, or wider than, the hole 4 for example the walls 301 to 304 delimiting the interlayer hole being set back by at most 10 mm or 5 mm from the walls of the glass 401 to 404. As a variant, this is a rectangle or any other shape encompassing the surface of the through-hole (trapezoidal or other).

Moreover, optionally, a polymer film forming selective filter 110' is adhesively bonded, for example by a pressure-sensitive adhesive 81, to the bonding surface 91.

FIG. 6 shows schematically in cross sectional view a windscreen 400 according to the invention with an infrared vision system such as a LIDAR in a fourth embodiment of the invention. FIG. 7 shows a schematic front view (passenger compartment side) of the windscreen 700 of FIG. 6.

Only the differences with the first embodiment are explained hereunder.

The opaque masking layer 5 is not widened in the central zone (passing by M).

A functional element forming selective filter 60 completes the masking (for the outside) in this central zone and is arranged inside the lamination interlayer, for example made of two PVB sheets. It has an upper edge 601 under the enamel zone 5 and a lower edge 602 toward the center of the windscreen, for example under an athermal layer 70 on face F2 12. The athermal electrically conductive layer 70 (solar control, heating, etc.) lacks or is provided with a first trapezoidal gap (as a variant, rectangular, or any other shape) in line with the through-hole 4.

The functional masking element 60 comprises a lamination or support particularly made of polymer for example PET of 100 µm, transparent at the working wavelength of the LIDAR with a first main face on the side of face F2 61 and with a second main face on the side of face F3 62.

The first face 61 (alternatively the second main face 62) bears a camouflaging coating that is opaque in the visible range 63 and transparent at the working wavelength.

As a variant, the first face 61 (alternatively the second main face 62) bears a coating that is opaque in the visible range the infrared, provided with a trapezoidal gap (as a variant, rectangular, or any other shape) in line with the through-hole 4.

The insert 60 can have a sensor (antenna, etc.) of a light-emitting screen particularly on face 62 side F3. The opaque insert 60 can comprise one or more gaps for these sensors.

Figure 9A:
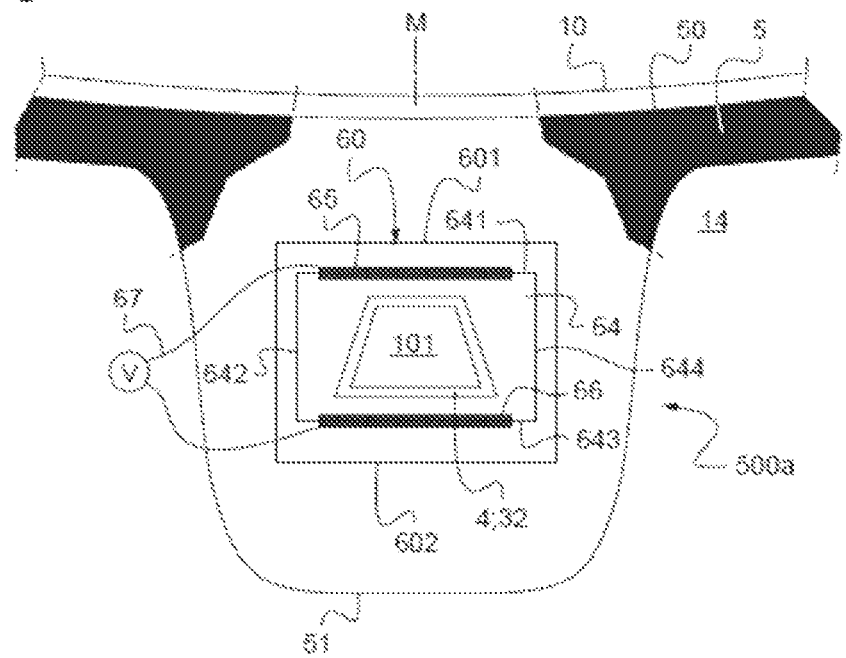
FIG. 9a shows a schematic front view (passenger compartment side) of this windscreen 500a of FIG. 8.
Figure 10A:
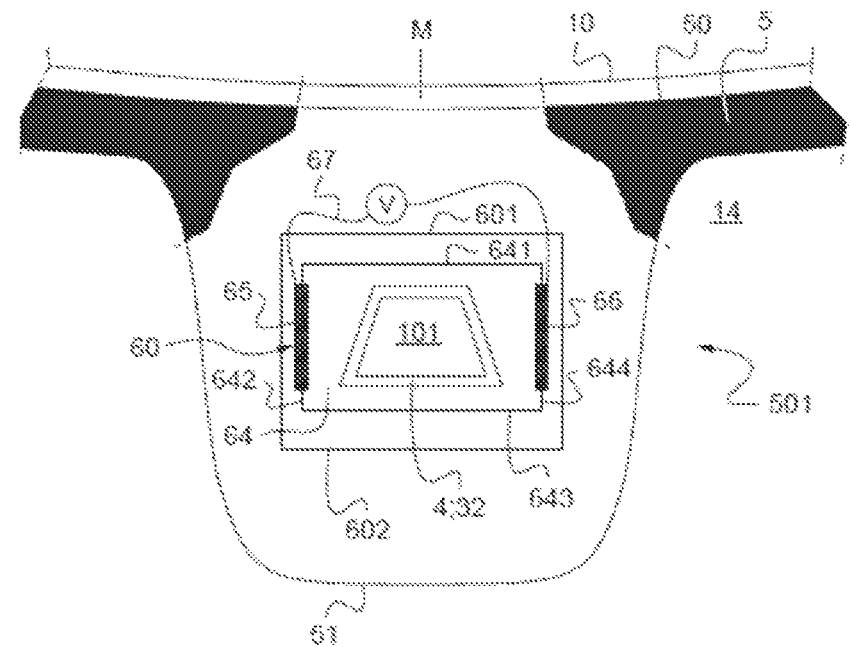
FIG. 10a shows a schematic front view (passenger compartment side) of the windscreen 501 in a variant of the fifth embodiment.

FIG. 8 shows schematically in cross sectional view a windscreen 500 according to the invention, with an infrared vision system such as a LIDAR in a fifth embodiment of the invention. FIG. 9a shows a schematic front view (passenger compartment side) of this windscreen 500a of FIG. 8. FIG. 10a shows a schematic front view (passenger compartment side) of the windscreen 501 in a variant of the fifth embodiment.

Only the differences with the first embodiment are explained hereunder.

The piece 9 is a camouflaging piece for example a glass ceramic or a colloidal glass.

A functional heating element 60 is arranged within the lamination interlayer 3, for example made of two PVB sheets. It has an upper edge 601 under the enamel zone 5 and a lower edge 602 toward the center of the windscreen. It extends so as to cover the region of the through-hole 4.

The functional heating element 60 comprises a polymer sheet or support, for example PET of 100 µm, transparent at the working wavelength of the LIDAR with a first main face on the side of face F2 61 and with a second main face on the side of face F3 62. The support is rectangular in shape with horizontal longitudinal edges 601 and 602.

The second face 62 (alternatively the first main face 61) bears a heating coating 64, for example rectangular in shape (same shape as the film 60) facing the through hole 4 forming a local heating zone. The heating coating is made of material which is transparent at least at the "working" wavelength in the infrared.

The horizontal longitudinal edges or large sides 641, 643 of the layer 64 can be parallel to the large sides of the through-hole 4. The small sides 642, 644 can be parallel to the small sides of the through-hole.

The rectangular heating zone 64 is provided with two electrical leads or first and second horizontal (dedicated) local busbars 65, 66 offset from the through-hole on either side of the large sides of the through-hole 4 supplied with power 67 for example at 15 V or 48 V, or even 12 V or 24 V.

The length of the busbars are adapted to measure, preferably equal to or longer than the large sides of the through-hole.

In the case of a round or oval through hole, the substantially horizontal busbars can be curved to match the shape of the through-hole.

It is sought to place the busbars as close together as possible in order to increase the power density.

The functional heating element 60 can have a sensor (antenna and) electroluminescent screen particularly on face 62 side F3.

The functional heating element 60 can also serve as camouflage by adding a camouflaging coating as described previously (especially if the piece 9 is transparent). The extent, the camouflaging coating can be preferably adapted on face 61, here opposite the heating layer or alternatively even on all or part of the heating layer and the busbars (preferably on face 61).

Figure 9B:
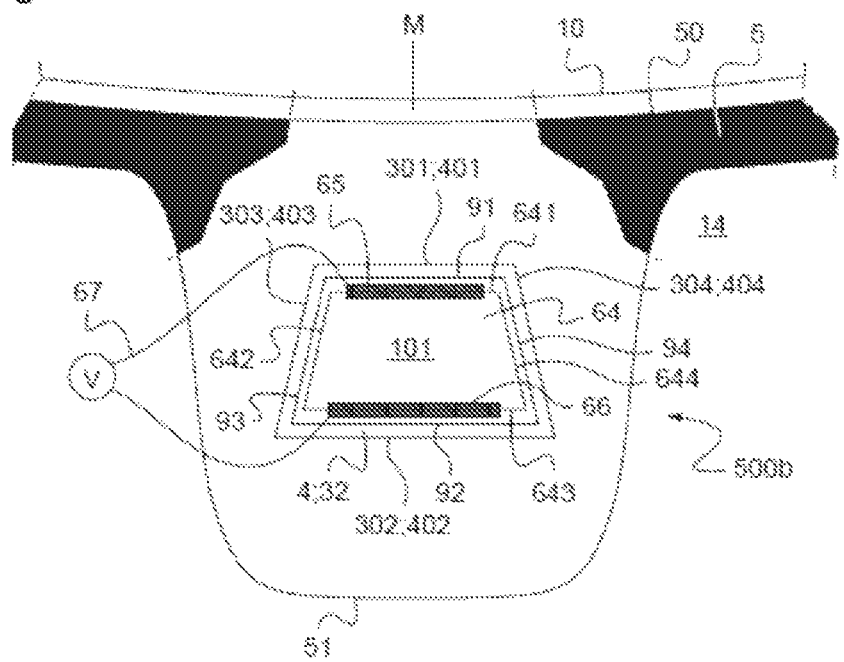
FIG. 9b shows a schematic front view of a windscreen (passenger compartment side) of a variant of the fifth embodiment.

FIG. 9b shows a schematic front view of a windscreen 500b (passenger compartment side) of a variant of FIG. 9a.

The support 60 is eliminated, and the heating layer 64 with the horizontal busbars 65, 66 is placed on the bonding surface 92 of the piece 9. The heating layer is for example the same shape as the piece, here trapezoidal. The horizontal longitudinal edges or large sides 641, 643 of the layer 64 are parallel to the large sides of the piece 9. The small sides 642, 644 are parallel to the small sides of the piece 9.

In FIG. 10a, the first, second busbars are lateral 65, 66, here vertical or, as a variant, oblique with respect to the small sides of the through-hole 4.

Vertical or oblique lateral busbars (parallel with respect to the small sides of the through-hole 4) may be preferred since horizontal busbars can generate local overthicknesses that promote distortions. The heating layer is rectangular or the same shape as the piece.

Figure 10B:
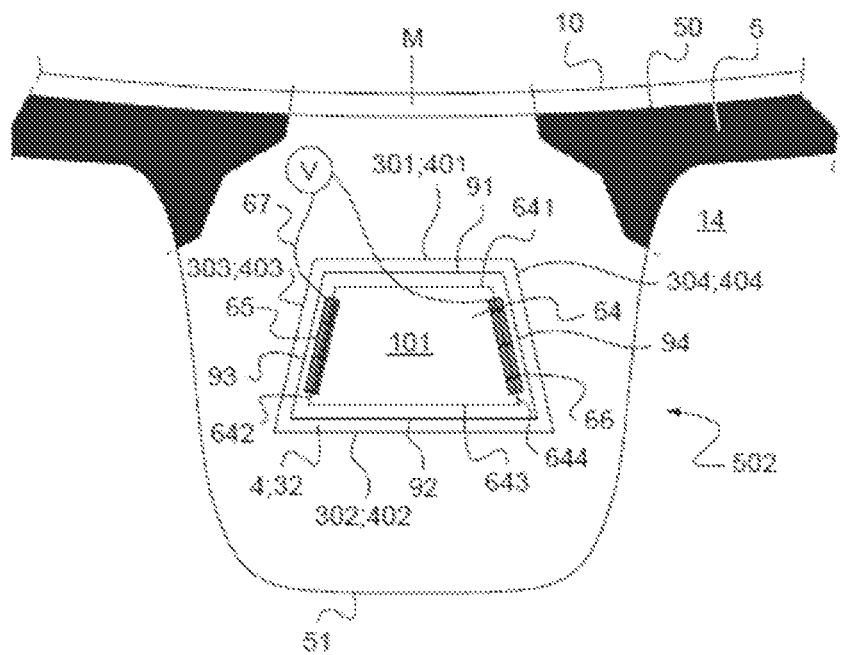
FIG. 10b shows a schematic front view of a windscreen (passenger compartment side) of another variant of the fifth embodiment.

FIG. 10b shows a schematic front view of a windscreen 502 (passenger compartment side) of a variant of FIG. 10a.

The support 60 is eliminated, and the heating layer 64 with the oblique busbars 65, 66 is placed on the bonding surface 92 of the piece 9. The busbars 65, 66 are parallel to the small sides of the piece (and of the layer 64).

FIG. 11 shows a schematic sectional view of a windscreen 600 according to the invention, with an infrared vision system such as a LIDAR in a sixth embodiment of the invention.

Only the differences with the fifth embodiment are explained below.

The piece 9 is transparent.

The functional heating element 60 also serves as camouflage by adding a camouflaging coating 63 as described previously. The extent, the camouflaging coating can be preferably adapted on face 61, here opposite the heating layer or alternatively even on all or part of the heating layer and the busbars 65, 66.

In an example of integration, the PVB has a partial interlayer hole (through-hole in the sheet, on the side of face F3).

The piece is in adhesive contact with a bonding film 3' which may be made of identical or different material to the PVB and/or have an identical or different thickness to said second sheet.

After lamination, the bonding film 3' is not necessarily distinguishable from said second sheet (and forming a PVB continuity by creep, the edges 301' and 302' being in contact with the edges 301 and 302)

Figure 13:
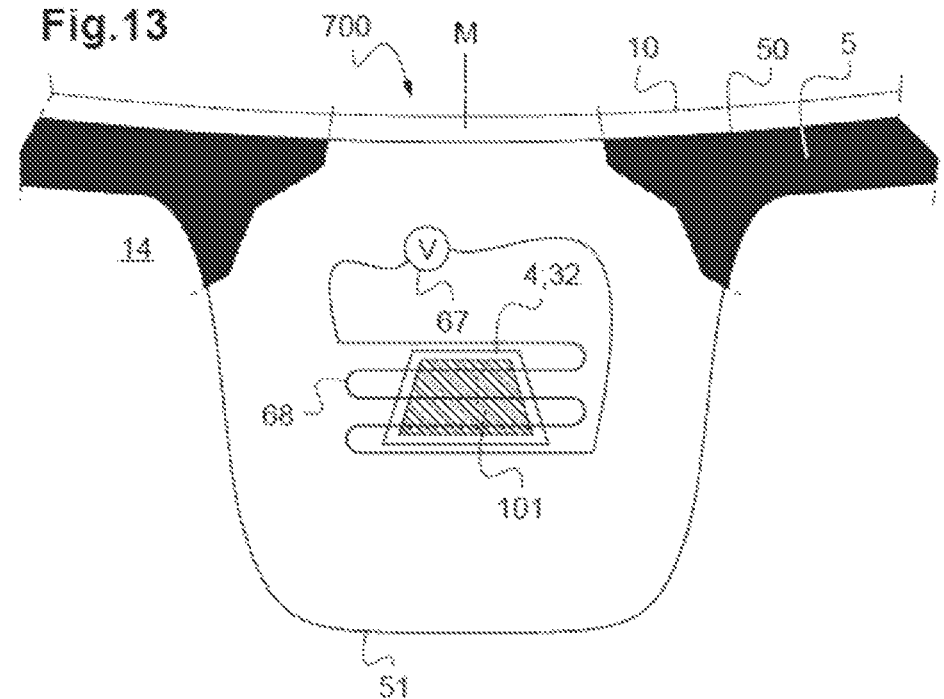
FIG. 13 shows a schematic front view (passenger compartment side) of the windscreen 700.
Figure 14:
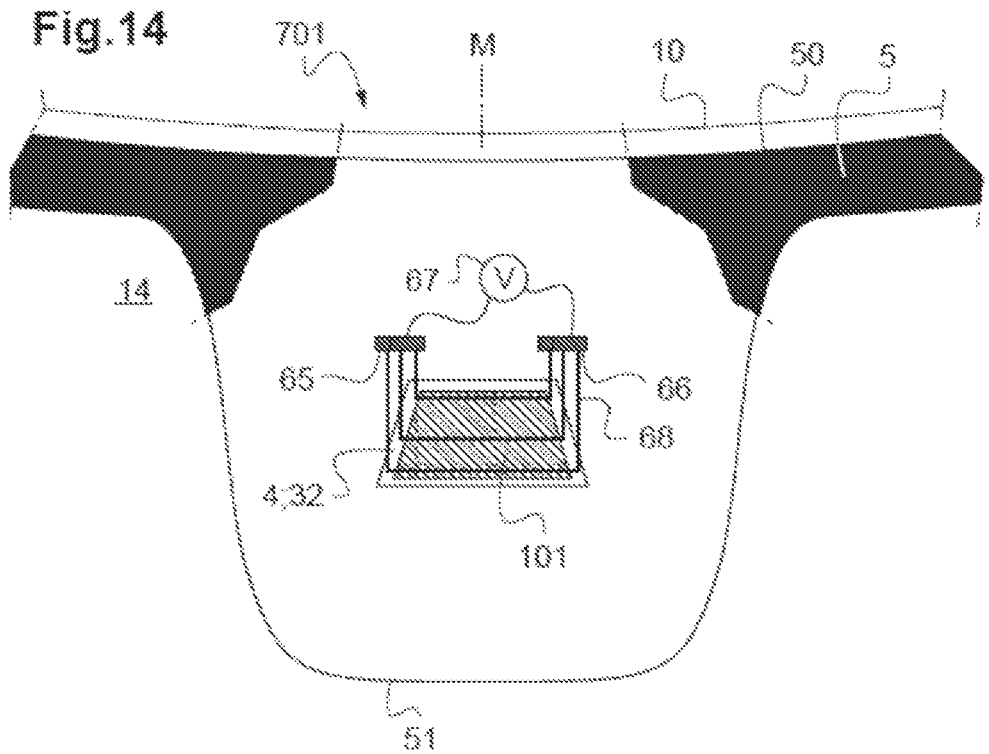
FIG. 14 shows a schematic front view (passenger compartment side) of the windscreen 700 in a first variant.
Figure 15:
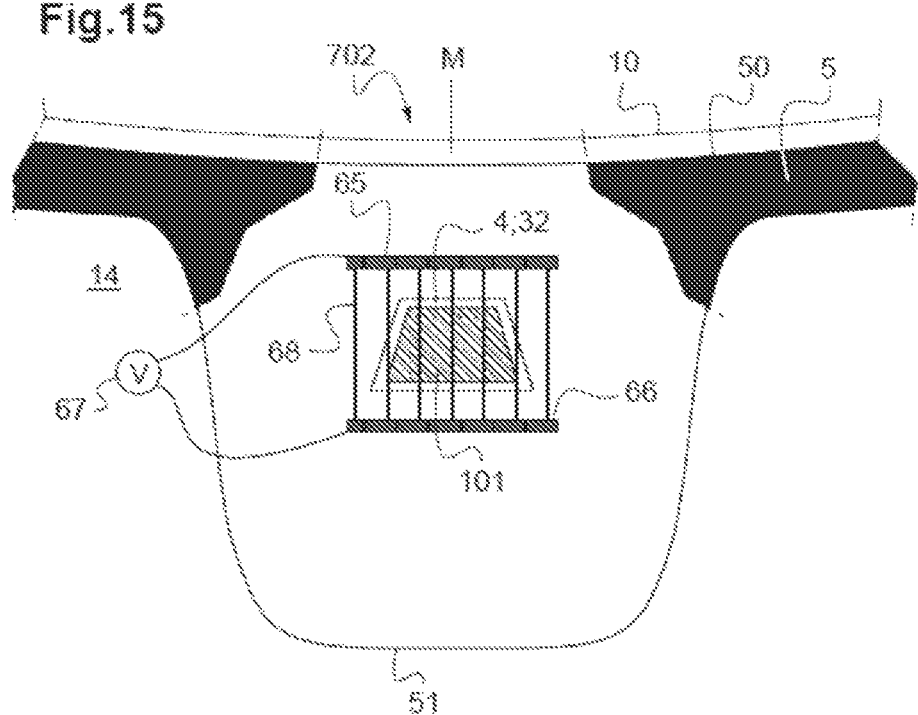
FIG. 15 shows a schematic front view (passenger compartment side) of the windscreen 702 in a second variant.

FIG. 12 shows a schematic sectional view of a windscreen 700 according to the invention, with an infrared vision system such as a LIDAR in a seventh embodiment of the invention. FIG. 13 shows a schematic front view (passenger compartment side) of the windscreen 700. FIG. 14 shows a schematic front view (passenger compartment side) of the windscreen 700 in a first variant. FIG. 15 shows a schematic front view (passenger compartment side) of the windscreen 702 in a second variant.

Only the differences with the first embodiment are explained hereunder.

Face Fb 32 comprises a first metal heating wire 68, anchored to the lamination interlayer, facing the through-hole 4, first coiling wire.

The wire 68 can also be on the side of face Fa or inside the lamination interlayer.

The supply of power can be adapted as a consequence. It is possible to use a flat connector in the upper zone for example between the hole and the upper longitudinal edge.

In FIG. 14, the local heating zone comprises a plurality of heating wires 68, connected to the supply of power by two adjacent horizontal busbars 65, 66 in the upper zone above the through-hole 4 or by a flat connector.

In FIG. 15, the first local heating zone comprises a plurality of first heating wires 67, connected to the supply of power by first and second horizontal busbars 65, 66 on either side of the through-hole 4.

Figure 16:
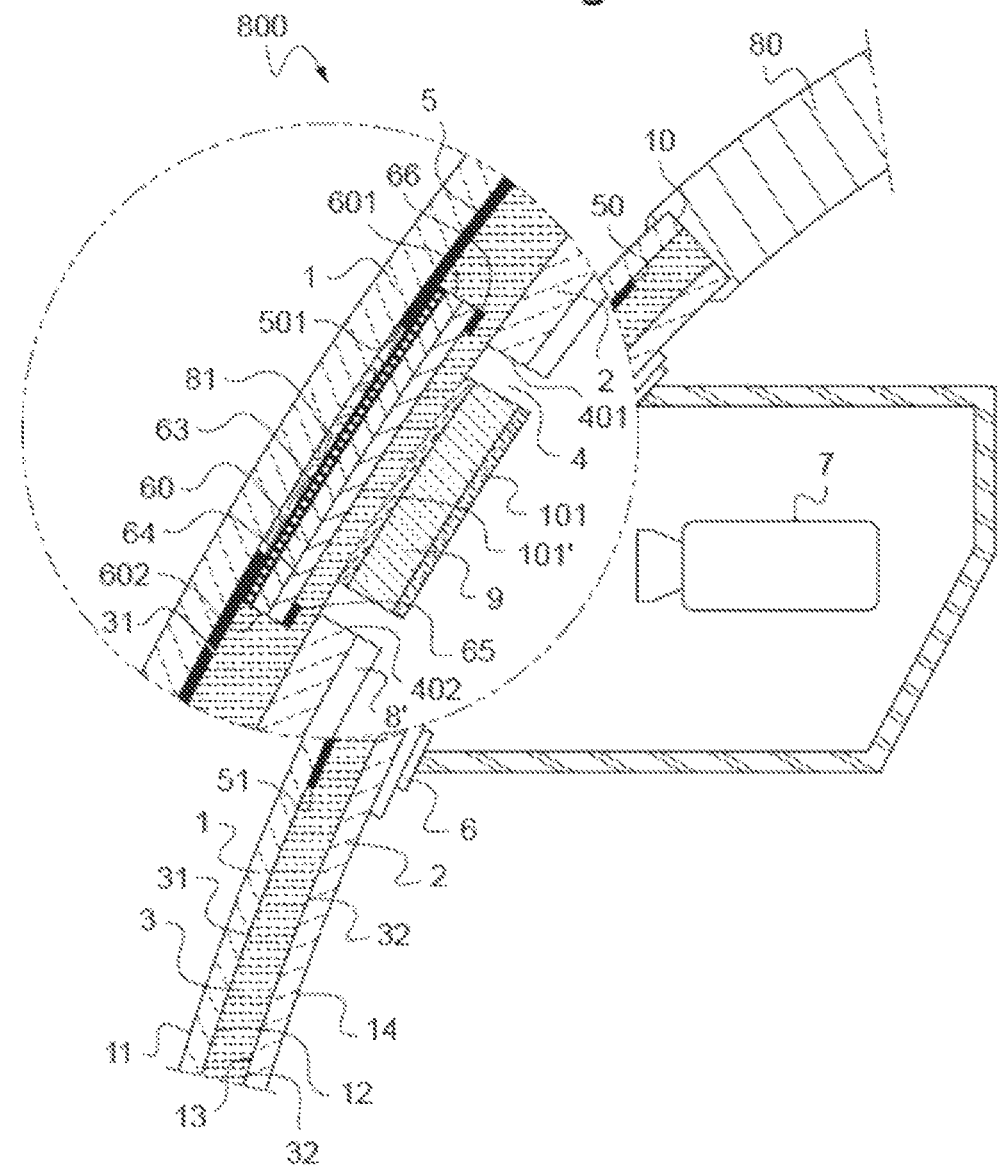
FIG. 16 shows a schematic sectional view of a windscreen 800 according to the invention, with an infrared vision system such as a LIDAR in an eighth embodiment of the invention.

FIG. 16 shows a schematic sectional view of a windscreen 800 according to the invention, with an infrared vision system such as a LIDAR in an eighth embodiment of the invention.

Only the differences with the fifth embodiment are explained below.

The piece 9 is transparent. It may have a functional coating 101' on the bonding surface 91.

The functional heating element 60 is adhesively bonded to face F2 by a glue 81 and is in adhesive contact with face Fa 31.

The functional heating element 60 also serves as camouflage by adding a camouflaging element 63 on face 61, here opposite the heating layer or alternatively even on all or part of the heating layer and the busbars (preferably on face 61).

FIG. 17 is a schematic sectional view showing the bending of a glass piece 9 with its anti-reflective element 91 (or the precursor thereof) according to the invention simultaneously to the bending of the first and second glass sheets 1, 2. The bending comprises a tempering operation.

The piece 9 is therefore curved, made of tempered glass preferably of a thickness of at least 0.7 mm and follows the curvature of the first glass sheet.

The anti-reflective element is preferably produced before or during the bending. For example, it is a coating (precursor of sol-gel silica with pore-forming agent) which is heat treated (to eliminate the pore-forming agent) by virtue of the bending to have the anti-reflective function, for example to form nanopores.

The invention claimed is:

1. A vehicle laminated glazing, with a given thickness, comprising:
    a first glass sheet intended to be an exterior glazing, with a first external main face and a second internal main face oriented toward a passenger compartment;
    a lamination interlayer made of polymer material with a first main face oriented toward the second internal main face and a second main face opposite the first main face;
    a second glass sheet intended to be an interior glazing with a third main face on the side of the second internal main face and a fourth internal main face oriented toward a passenger compartment, wherein the first glass sheet has a total iron oxide content by weight of at most 0.05%,
    a through-hole in a thickness of the second glass sheet, the through-hole being centimetric, hole delimited by a wall, closed-off hole or opening hole,
    and, in the through-hole, a piece made of mineral material which is transparent at least at a working wavelength in an infrared in a range extending from 800 nm to 1800 nm, which piece has an edge face in contact with or spaced apart from the wall by a distance of at most 5 mm,
    the piece having a main bonding surface, bonded to a thermoplastic bonding film which is optionally different from the lamination interlayer, or bonding surface bonded to the second main face of the lamination interlayer and an interior surface opposite from the bonding surface, the interior surface comprising an anti-reflective element at said working wavelength.

2. The vehicle laminated glazing according to claim 1, wherein, facing said through-hole, the first glass sheet, the lamination interlayer, the piece with said anti-reflective element has a total transmission of at least 90.0% at the working wavelength.

3. The vehicle laminated glazing according to claim 1, wherein the anti-reflective element comprises an anti-reflective coating on the interior surface.

4. The vehicle laminated glazing according to claim 3, wherein the anti-reflective coating comprises a layer of porous silica.

5. The vehicle laminated glazing according to claim 3, wherein the anti-reflective coating comprises a stack of dielectric layers alternating high and low refractive indices at said working wavelength.

6. The vehicle laminated glazing according to claim 1, wherein the piece is spaced apart from the wall by a distance of at least 0.3 mm and at most 3 mm.

7. The vehicle laminated glazing according to claim 1, wherein the piece is curved and has a thickness of at least 0.1 mm or 0.3 mm.

8. The vehicle laminated glazing according to claim 7, wherein the piece is a tempered glass.

9. The vehicle laminated glazing according to claim 1, wherein the piece is made of glass having a total iron oxide content by weight of at most 0.05%.

10. The vehicle laminated glazing according to claim 1, wherein the piece is made of tempered glass or glass-ceramic.

11. The vehicle glazing according to claim 1, further comprising, under and/or in the through-hole, a selective filter that absorbs in the visible range and is transparent at the working wavelength, spaced apart from or associated with the bonding surface, or the piece forms said selective filter, the laminated glazing then having a total transmission of at most 10.0%, 5.0%, or 1.0% or 0.5% in the visible range.

12. The vehicle laminated glazing according to claim 11, wherein the piece forms said selective filter, the piece is a glass or is a glass ceramic, or wherein the piece is transparent in the visible range and comprising said selective filter as a film on the bonding surface.

13. The vehicle laminated glazing according to claim 11, wherein the selective filter is a camouflaging coating on the second internal main face, facing the through-hole, and even protruding under the third main face.

14. The vehicle laminated glazing according to claim 1, wherein the through-hole has a surface section, having a smallest dimension of at least 3 cm and/or a largest dimension of at most 20 cm.

15. The vehicle laminated glazing according to claim 1, further comprising a local heating zone under and/or in said through hole, spaced apart or on the bonding surface.

16. The vehicle laminated glazing according to claim 1, further comprising a functional element bonded to the lamination interlayer, wherein the functional element comprises a polymer sheet of sub-millimetric thickness, the functional element having a first zone facing the through-hole and, in the first zone, said functional element being transparent at said working wavelength in the infrared.

17. The vehicle glazing according to claim 16, wherein the functional element comprises on a first main face oriented toward the second internal main face or the third main face:
the electrically conductive coating forming a heating layer facing the through-hole,
and/or the functional element comprises, on the first main face or a second, opposite main face:
a camouflaging coating facing the through-hole and even protruding under the third main face,
or an opaque masking element at least partially offset from the through-hole.

18. The vehicle laminated glazing according to claim 1, wherein the first glass sheet comprises, on the second internal main face, a functional coating with a first zone facing the through-hole, which functional coating is transparent at said working wavelength in the first zone.

19. The vehicle laminated glazing according to claim 1, wherein the lamination interlayer comprises a PVB, optionally having a partial interlayer hole, in line with the through-hole, the bonding surface is bonded to second main face of the lamination interlayer, or the lamination interlayer comprises a PVB, having an interlayer through-hole, in line with the through-hole.

20. The vehicle glazing according to claim 1, further comprising on the second internal main face a functional layer extending over all or part of the glazing, which functional layer is absorbent at said working wavelength and which is absent from said through-hole at least in a central zone of said through-hole and present at an edge of the through-hole between the second internal main face and the first main face of the lamination interlayer,
and wherein optionally a functional coating is on the second internal main face, transparent at the working wavelength, faces the through-hole being in contact with said functional layer.

21. A method for manufacturing said laminated glazing according to claim 1, comprising:
a) by lamination, the thermoplastic bonding film, which is different from or the same as the interlayer material, is in adhesive contact with the second internal main face or with a functional coating on the second internal main face, or with the second main face of the lamination interlayer or with a polymer film,
b) or by lamination, the piece is in adhesive contact with the second main face of the lamination interlayer, or, before lamination, the piece is curved separately or simultaneously to the first and second glass sheets.

22. A device, comprising:
said laminated glazing according to claim 1, and
an infrared vision system at the working wavelength in the infrared, arranged in the passenger compartment behind said glazing and comprising a transmitter and/or receiver, so as to transmit and/or receive radiation passing through the first glass sheet at the through-hole.

23. The vehicle laminated glazing according to claim 1, wherein the second glass sheet has a total iron oxide content by weight of at least 0.4%.

* * * * *